United States Patent [19]

Schaefer et al.

[11] Patent Number: 6,157,927

[45] Date of Patent: Dec. 5, 2000

[54] METHODS AND APPARATUS FOR ENABLING A COMPONENT IN A FIRST TRANSACTION PROCESSING ENVIRONMENT TO ACCESS A RESOURCE IN ANOTHER ENVIRONMENT THAT IS UNDER THE CONTROL OF AN XATMI COMPLAINT TRANSACTION MANAGER

[75] Inventors: Diane E. Schaefer, North Wales; Steven L. Kayser, Paoli; Steven L. Rajcan, Collegeville, all of Pa.

[73] Assignee: Unisys Corporation, Blue Bell, Pa.

[21] Appl. No.: 09/064,160

[22] Filed: Apr. 22, 1998

[51] Int. Cl.[7] .................................................. G06F 17/30
[52] U.S. Cl. ........................... 707/103; 707/10; 707/202; 709/201
[58] Field of Search ............................. 707/10, 103, 202; 709/201

[56] References Cited

U.S. PATENT DOCUMENTS

| | | | |
|---|---|---|---|
| 5,428,771 | 6/1995 | Daniels et al. | 395/575 |
| 5,561,797 | 10/1996 | Gilles et al. | 395/600 |
| 5,586,312 | 12/1996 | Johnson et al. | 395/610 |
| 5,680,610 | 10/1997 | Smith et al. | 395/610 |
| 5,754,772 | 5/1998 | Leaf | 395/200.33 |
| 5,768,587 | 6/1998 | Freund et al. | 395/671 |
| 5,923,833 | 7/1999 | Freund et al. | 395/182.17 |

FOREIGN PATENT DOCUMENTS

| | | |
|---|---|---|
| 0 533 407 | 3/1993 | European Pat. Off. . |
| 2 316 777 | 3/1998 | United Kingdom . |

OTHER PUBLICATIONS

Takuma Sudo. et al, "Transaction Processing In Distributed Environments," Hitachi Review, vol. 45, No.2, Apr. 1,1996, pp. 55–60, XP000622834, ISSN: 0018–277X.

Jiang Liang, Simone Sedillot, Bruno Traverson, "OMG Object Transaction Service Based On An X/Open and ISO OSI TP Kernel", IEEE, pp. 110–119, 1997.

In–Cheol Jeong, Young–Cul Lew, DCE (Distributed Computing Environment Based DTP(Distributed Transaction Processing), IEEE, pp. 701–704, 1998.

*Primary Examiner*—John Breene
*Assistant Examiner*—Cheryl Lewis
*Attorney, Agent, or Firm*—Rocco L. Adornato; Mark T. Starr; Lisa A. Rode

[57] ABSTRACT

An interconnect for enabling a component in a transaction processing environment to request, as part of a global transaction under the control of a transaction manager that is not XATMI-compliant, a resource on a remote server outside of that environment that is under the control of an XATMI-compliant transaction manager, comprises a resource manager and a connection manager. The resource manager has a first interface that receives XATMI service requests from the component and a second interface that receives directives issued by the first transaction manager for the global transaction. The resource manager (i) translates the XATMI service requests and directives into corresponding service requests of a bi-directional two-phase commitment communications protocol, (ii) issues the corresponding service requests to a protocol machine of the connection manager, and (iii) coordinates the processing of the corresponding service requests by the protocol machine with the processing of corresponding events in the transaction processing environment of the first transaction manager. The resource manager further comprises (i) means for mapping a first identifier that identifies the global transaction within the transaction processing environment of the first transaction manger to a second identifier that uniquely identifies the transaction within the protocol machine, (ii) means for maintaining a record for each branch of the transaction in which information relating thereto is stored, and (iii) means for logging together, in a secure storage, recovery information for both the transaction processing environment of the first transaction manager and the protocol machine.

100 Claims, 22 Drawing Sheets crm_id →

| next |
| --- |
| prev |
| txstate |
| msg_q |
| svcname |
| enc_type |
| recip_ae |
| *EnlistObj |
| *ExportObj |
| *TransObj |
| *TransCookie |
| TransCookieLen |
| tp_id |
| aaid/brid |
| mts_guid |
| *pPrepInfo |
| *log_rec |

*Figure 5*

| event | FINITO (0) | XTR_DIAGACT (1) | enlisting(2) | enlisted(3) |
|---|---|---|---|---|
| xatmi_call req (tpcall) | mtran [createCrm] [getAAID] [CallRq] [GetrplyRq] 1 <br> ^mtran [createCrm] [CallRq] [GetrplyRq] 0 | | | |
| xatmi_call req (tpacall) | mtran [createCrm] [getAAID] [CallRq] 1 <br> ^mtran [createCrm] [CallRq] 0 | | | |
| xatmi_connect req | mtran [createCrm] [getAAID] [CallRq] [GetrplyRq] 1 <br> ^mtran [createCrm] [CallRq] [passXATMI] 0 | | | |

*Figure 6A*

| event | FINITO (0) | XTR_DIAGACT (1) | enlisting(2) | enlisted (3) |
|---|---|---|---|---|
| xatmi_reply ind | [DeliverInd][PassXATMI] 0 | [DeliverInd][MTSEnlist] 2 | | |
| enlist with mts | | | menlist 3 ; ^menlist [Vxtperrno=TPESYSTEM][AbandonRq] 7 | |
| xatmi_reply_ind xatmi_failure_ind xatmi_data_ind | | [MTSEnlist] 2 | | |
| XATMI-Cleanup | [AbortRq][RemoveCrm] 0 | [AbortRq] 7 | [AbortReq] 7 | [AbortReq] 7 |
| xatmi_cancel req | [AbortRq][RemoveCrm] 0 | | | |
| xatmi_discon req | | [AbortRq] 7 | [AbortReq] 7 | [AbortReq] 7 |
| TP_BEGIN_DIALOGUE_ (CNF/Accept) | [enqueueMsg] 0 | mtrans [MTSEnlist] 3 | | |
| TP_BEGIN_DIALOGUE_ (CNF/Reject) | [AbortRq][RemoveCrm][Vxtperrno=TPESYSTEM][enqueueMsg] 0 | [AbortRq][Vxtperrno=TPESYSTEM][RemoveCrm] 0 | | |
| tp_abort_ind | [enqueueMsg] 0 | [enqueueMsg] 1 | [enqueueMsg] 2 | |

*Figure 6B*

| event | Finito(0) | enlisted (3) | preparing (4) | prepared (5) | committing (6) | aborting (7) | recovering (8) |
|---|---|---|---|---|---|---|---|
| prepare request (MTS) | | [icPrepare]₄ | | | | [icPrepare]₇ | |
| abort request (MTS) | | [icRollback]₇ | [icRollback]₇ | [icRollback]₇ | | [Vmdone=T][icRollback]₇ | |
| commit request (MTS) | | | | [icCommit]₆ | | | |
| ready_ind (HTP) | [Remove Crm]₀ | | [securelog][PrepReqDone]₅ | | | [PrepReqDoneF]₇ | |
| rollback_complete (HTP) | | | [loghaz][PrepReqDoneF][RemoveCrm]₀ | | | [loghaz][AbortReqDone][RemoveCrm]₀ | [logforget][loghaz][CountComp][RemoveCrm]₀ |
| commit_complete (HTP) | | | | | [logforget][loghaz][ComReqDone][RemoveCrm]₀ | | [logforget][loghaz][CountComp][RemoveCrm]₀ |
| ic_prepare | | | [PrepareRq]₄ | | | [PrepReqDoneF][RemoveCrm]₀ | |
| ic_commit | | | | | [CommitRq]₆ | | |

*Figure 6C*

| event | Finito(0) | enlisted (3) | preparing (4) | prepared (5) | commiting (6) | aborting (7) |
|---|---|---|---|---|---|---|
| ic_rollback | | | | | | ^mdone<br>[forgetlog]<br>[RollbackRq] 7 |
| | | | | | | mdone<br>[forgetlog]<br>[AbortReqDone]<br>[RemoveCrm] 0 |
| abort_ind | [enqueueMsg]₀ | 7 | [PrepReqDoneF]<br>[RemoveCrm]₀ | | | |
| XATMI-CLEANUP | [AbortRq]<br>[RemoveCrm]₀ | [AbortRq] 7 | [AbortRq] 7 | 5 | 6 | 7 |

*Figure 6D*

METHODS AND APPARATUS FOR ENABLING A COMPONENT IN A FIRST TRANSACTION PROCESSING ENVIRONMENT TO ACCESS A RESOURCE IN ANOTHER ENVIRONMENT THAT IS UNDER THE CONTROL OF AN XATMI COMPLAINT TRANSACTION MANAGER

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to distributed transaction processing systems. More particularly, the present invention is directed to methods and apparatus for enabling a component in a first transaction processing environment, such as, for example, a Microsoft Transaction Server environment, to access a resource on a remote server in another transaction processing environment that is under the control of an XATMI-compliant transaction manager.

2. Description of the Prior Art

I. On-Line Transaction Processing.

On-line transaction processing (OLTP) is a technology that has been used successfully for business-critical applications by large enterprises for many years. With OLTP, users at terminals send messages to application programs, and these in turn update databases in real time. This is in contrast to batch or queued processing of transactions where the transactions are processed at a later time.

An example of an OLTP application is an airline reservation system. When a travel agent sends a request to reserve a seat on a plane, a database is updated accordingly, and a confirmation message is sent back to the agent's terminal. All of the tasks are part of a single transaction, and many agents can perform transactions at the same time. OLTP systems are typically used in environments that support large numbers of users, all accessing the same database, with hundreds and sometimes thousands of transactions taking place each second. The systems are typically based on large enterprise servers that can provide the performance, reliability, and data integrity demanded by these environments.

A transaction may be thought of as a set of actions performed by a transaction processing system wherein the actions together exhibit the properties of Atomicity, Consistency, Isolation, and Durability (ACID). The following definitions are given in *Transaction Processing: Concepts and Techniques*, by Jim Gray and Andreas Reuter, Morgan Kaufmann Publishers, Inc., 1993, p. 6:

Atomicity. A transaction's changes to the state are atomic; either all happen or none happen. These changes include database changes, messages, and actions on transducers.

Consistency. A transaction is a correct transformation of the state. The actions taken as a group do not violate any of the integrity constraints associated with the state. This requires that the transaction be a correct program.

Isolation. Even though transactions execute concurrently, it appears to each transaction, T, that other transactions execute either before T or after T, but not both.

Durability. Once a transaction completes successfully, (commits), the state of the data is changed to reflect the successful completion of the transaction, and the state of the data will survive system failures.

To maintain the properties identified above, at the beginning of processing a transaction, a transaction processing application program typically invokes some form of begin-transaction function to indicate that processing of a transaction has begun. This operation is typically logged to an audit file to demarcate the operations associated with the particular transaction. Following the begin-transaction function, the other functions associated with the application-defined transaction are performed and are also logged to an audit file. If all operations associated with a transaction complete successfully, a commit function is invoked to make permanent any state changes that have occurred as a result of the transaction. The commit operation is logged to the audit file to indicate that all operations have completed successfully. If an error occurs during processing of the transaction and a commit operation is not performed, a rollback function is invoked to undo the effects of the operations performed to that point in processing the transaction.

Distributed Transaction Processing (DTP) is a form of on-line transaction processing that allows a single transaction to be performed by multiple application programs that access one or more databases on one or more computers across a network. This type of transaction, in which multiple application programs cooperate, is called a distributed transaction. Using DTP, for example, related databases at regional and branch locations can be synchronized. DTP also facilitates transaction processing across multiple enterprises. For example, DTP can be used to coordinate the computers of manufactures and suppliers, or to coordinate the computers of enterprises in related industries, such as the travel agency, airline, car rental, and hotel industries.

Transaction processing in a distributed environment can be either non-global or global. In a non-global transaction, the same work takes place as in a traditional transaction, but the work is distributed in a client/server manner. For example, a travel agent may request an airline reservation via a client application program that has a graphical user interface. The client application program communicates with a server application program that manages the reservation database. The server application program updates the database, commits or aborts its own work, and returns information to the client application program, which notifies the travel agent.

A global transaction consists of multiple, coordinated database updates, possibly occurring on different computers. Global transactions are used when it is important that all databases are synchronized so that either all updates are made or none are made. Continuing with the previous example, the travel agent may also need to reserve a rental car and hotel room. The customer who is traveling wants to make sure that all reservations are coordinated; if a flight is unavailable, the hotel and car reservations are not needed. For the purpose of illustrating a global transaction, the airline, car, and hotel databases are on different transaction processing systems.

The global transaction begins when the travel agent requests the reservation from a workstation client application program with a graphical user interface. The client program contacts three server application programs on different transaction processing systems. One server program books a flight, another reserves a car, and the third makes a hotel reservation. Each of the server application programs updates its respective database. The transactions processed by each of the server application programs may be referred to as subordinate transactions of the global transaction. A global transaction manager coordinates the updates to the three databases, and a subordinate transaction manager on each of the individual transaction processing systems coordinates locally with the server application programs. The server application programs return information to the client application program.

A major advantage of global transaction processing is that tasks that were once processed individually are processed as a group, the group of tasks being the global transaction. The database updates are made on an all-or-nothing basis. For example, if an airline seat is not available, the hotel and car reservations are not made. Thus, with a global transaction, tasks that were once performed independently may be coordinated and automated.

As with non-global transactions, global transactions must possess the ACID properties. In order to preserve the ACID properties for a global transaction, the commit processing is modified to a two-phase commit procedure. Under a two-phase commit, a global transaction manager first requests that each of the subordinate transaction managers prepare to commit their updates to the respective databases. If all the local transaction managers respond that they are prepared to commit, the global transaction manager sends a commit request to the local transaction managers. Thus, the two parts of the two-phase commit process are (i) prepare to commit the database updates, and (ii) commit the database updates. If any one of the transaction managers is unable to prepare to commit, the entire global transaction is aborted and each transaction manager performs a rollback function to undo the processing that may have occurred up to that point. In short, the two-phase commit process ensures that multiple databases participating in a single global transaction are synchronized—either all database updates requested by the global transaction are made or, in the event of system or component failure, none are made. Two-phase commit guarantees global data integrity and preserves the ACID properties in a DTP environment.

II. The X/Open Distributed Transaction Processing Model.

An industry consortium of users and vendors, known as X/Open™, has developed a model architecture for DTP, referred to as the X/Open Distributed Transaction Processing model. The X/Open DTP model is a software architecture that allows multiple application programs to share resources provided by multiple resource managers, and allows their work to be coordinated into global transactions. The X/Open DTP model comprises a number of components, application programming interfaces, and communications interfaces.

FIG. 1 illustrates a client system 10 and a server system 12 both constructed in accordance with the X/Open DTP model architecture. Referring to the client system 10 as an illustrative example, the components of the X/Open DTP model include an application program (AP) 14, one or more resource managers (RMs) 16, a Transaction Manager (TM) 18, and a Communications Resource Manager (CRM) 20.

An Application Program (AP), such as client application program 14, is a user-defined software component that defines global transaction boundaries and specifies actions that constitute global transactions. It also provides access to one or more resources that are required by a transaction. In a global transaction, two or more APs perform their individual functions which, when combined, make up the global transaction. One of the APs will be the transaction coordinator, that is, the AP that starts and finishes the global transaction. The other APs will be subordinate.

A Resource Manager (RM) 16 provides access to a resource for the AP 14. The X/Open DTP model permits multiple resource managers. Database management systems and file access systems are examples of system software components that act as RMs.

The APs begin and end transactions under the control of the Transaction Manager (TM) 18. The TM 18 is a system software component that assigns transaction identifiers to global transactions, monitors their progress, coordinates their completion, and coordinates failure recovery. The TM enforces the transaction property of atomicity. In a global transaction, the TM adheres to the two-phase commit transaction processing protocol.

The CRM 20 controls communication between the AP 14 and other APs (e.g., AP 40) that are participating in global transactions, as well as between the TM 18 and TMs on separate data processing systems (e.g., the TM of system 12).

The X/Open DTP model provides a number of standard application programming interfaces that enable application programs to interact with system components to conduct global transactions. These application programming interfaces include one or more AP-RM interfaces 22, an AP-TM interface 24, an AP-CRM interface 26, an RM-TM interface 28, and a TM-CRM interface 30.

The AP-RM interfaces 22 provide the AP 14 with access to resources (such as databases) through their respective RMs 16. These interfaces are not specifically defined by the X/Open DTP model, as a number of different resources can exist on a system. Examples of AP-RM interfaces include the Structured Query Language (SQL) and the Indexed Sequential Access Method (ISAM).

The AP-TM interface 24 is provided by the TM 18 to define global transaction boundaries. The AP-TM interface is also referenced as the TX interface. Further information on the TX interface is available in Distributed Transaction Processing: The TX (Transaction Demarcation) Specification, X/Open Company Limited, U.K., (1992). The TX interface is described in somewhat greater detail below.

The AP-CRM 26 interfaces are provided by the CRM 20 to the AP 14. The X/Open DTP model supports the following three AP-CRM interfaces: the TxRPC interface, the XATMI interface, and the CPI-C interface. Each of these interfaces can be used to enable communication between APs that utilize the same interface. Although the XATMI interface is discussed below in somewhat greater detail, further information on the XATMI interface is available in Distributed Transaction Processing: The XATMI Specification, X/Open Company Limited, U.K., (1993)(hereinafter "the XATMI Specification"), which is incorporated herein by reference in its entirety.

The TM-RM interface 28 is used for purposes of transaction control (preparing, committing, or rolling-back). The TM-RM interface 28 is described further in XA Interface, Distributed Transaction Processing: The TX (Transaction Demarcation) Specification, X/Open Company Limited, U.K. (1992). The TM-CRM interface 29 is described further in X/Open Preliminary Specification—Distributed Transaction Processing: The XA+Specification, X/Open Company Limited, U.K. (1993).

In addition to the foregoing application programming interfaces, systems that implement the X/Open DTP model can communicate with each other using an industry standard communications protocol know as Open Systems Interconnection (OSI) Transaction Processing (TP) (ISO/IEC 10026) ("the OSI TP Standard"), all parts of which are hereby incorporated by reference in their entireties. The OSI TP Standard defines a machine independent protocol that supports communications between computers in a transaction processing system. An industry standard CRM-OSI TP programming interface, called XAP-TP, provides an interface between a CRM 20 and an OSI TP protocol machine 34 that conforms to the OSI TP Standard. ISO/IEC 10026-3, Information Technology—Open Systems Interconnection—Distributed Transaction Processing—Part 3: Protocol Specification ("the OSI TP Protocol Specification") defines the state transitions and protocols that a conformant OSI TP protocol machine must generate in processing OSI TP service requests in accordance with the OSI TP Standard. The XAP-TP programming interface is specified in X/Open ACSE/Presentation: Transaction Processing API (XAP-TP) CAE specification ("the XAP-TP Specification"). The XAP-TP Specification defines the interface, including functions, parameters, and errors, that controls the use of a conformant OSI-TP protocol machine. An implementation of lower layer communication protocols 36 handles the low-level communication chores needed to send information between systems 10 and 12 via a network 38. These lower layer protocols can, for example, be OSI or TCP/IP. The X/Open DTP model does not define an interface to these lower layers.

The XATMI API provides a set of function calls, collectively referred to as the tp*( ) function calls, that can be called to perform various functions. Table 1 is a list of these functions, callable from any C language application program.

TABLE 1

Service Requests (Function Calls) of the XATMI API.

| Name | Description |
| --- | --- |
| | Typed Buffer Functions |
| tpalloc() | Allocate a typed buffer. |
| tpfree() | Free a typed buffer. |
| tprealloc() | Change the size of a typed buffer. |
| tptypes() | Determine information about a typed buffer. |
| | Functions for Writing Service Routines |
| tpservice() | Template for service routines. |
| tpreturn() | Return from a service routine. |
| | Functions for Dynamically Advertising Service Names |
| tpadvertise() | Advertise a service name. |
| tpunadvertise() | Unadvertise a service name. |
| | Functions for Request/Response Services |
| tpacall() | Send a service request. |
| tpcall() | Send a service request and synchronously await its reply. |
| tpcancel() | Cancel a call descriptor for an outstanding reply. |
| tpgetrply() | Get a reply from a previous service request. |
| | Functions for Conversational Services |
| tpconnect() | Establish a conversational service connection. |
| tpdiscon() | Terminate a conversational service connection abortively. |
| tprecv() | Receive a message in a conversational connection. |
| tpsend() | Send a message in a conversational connection. |

Each of the foregoing XATMI API requests has a formal syntax that specifies the format and arguments of each request. The formal syntax for each request is specified in the XATMI Specification.

III. Microsoft Transaction Server.

Microsoft Corporation has recently introduced a product called Microsoft® Transaction Server (MTS) that provides a component-based programming model and execution environment for developing and deploying distributed applications. "Microsoft," "Windows," and "Windows NT" are registered trademarks of Microsoft Corporation.

MTS allows users to build three tier applications. Client applications may be either DCOM or IIS applications. MES becomes the middle tier supporting reusable business logic, and the data store becomes the third tier. The technology is based on the idea of building reusable components in the form of COM objects that comprise all business logic. Examples of such components include the following types: Query: data inputted, then the component binds to the data store to get the information; Update: execute a transaction and send a message to update a data base.

In the MTS environment, a client application requests an instance of an MTS component to perform a given task. The MTS component provides the business logic associated with that task. When a client application makes a request for a component instance, MTS instantiates the MTS component and returns a reference to the client application. Every instance of an MTS component has an associated context object that holds information about the MTS component. The context object of each MTS component exposes an IObjectContext interface comprising a number of methods. Two methods relating to transaction processing are IObjectContext::SetComplete( ) and IObjectContext::SetAbort( ). An MTS component invokes SetComplete( ) when it has successfully completed executing its work. SetAbort( ) is invoked if the work is not completed successfully. A global method provided by MTS, called GetObjectContext( ), is used to obtain a reference to the IObjectInterface of a context object.

MTS components (i.e., COM objects) are written as single thread units and the MTS executive handles any concurrency issues. MTS enables developers to collect a series of such components into a package to make deployment easier. Unlike with the X/Open DTP model, the MTS component developer does not have to worry about how components will be combined into global transactions. MTS components are written as all-encompassing units and are configured as either requiring or supporting a transaction, or having non-transaction properties. When an MTS component is instantiated, MTS validates its transactional properties, and if the MTS component is configured to be transactional, MTS instantiates the component with those properties. An MTS component that is instantiated with transactional properties will enlist (i.e., join) in a transaction, if one is in progress.

A Distributed Transaction Controller (MS DTC) within the MTS environment controls the enlistment of components in global transactions, and also coordinates transaction commitment. The MS DTC implements two-phase commitment processing. Unlike the X/Open DTP model, however, MTS transactions are not demarked by the client application as having a beginning and end. Rather, through the enlistment process, the life of a transaction is controlled by the MS DTC.

In any transaction processing system, each resource in the system is controlled by a resource manager that declares itself by contacting the local transaction manager. In the MTS environment, the local transaction manager is the MS DTC, and the process by which a resource manager declares itself to the MS DTC is referred to as enlistment (to be distinguished from enlistment in a transaction). After a resource manager has enlisted with the MS DTC, it waits for requests from an executing application. When a request associated with a new transaction arrives, the resource manager must also then enlist in that transaction. This ensures that the resource manager will get callbacks (i.e., indications) from the MS DTC when the transaction commits or aborts.

The MS DTC supports transactions that are distributed across two or more Windows® 95 or Windows NT® systems. Each system has a local transaction manager—the MS DTC. All components and resource managers communicate with their local transaction managers. The transaction managers cooperatively manage transaction protocols that span systems using OLE Transaction Protocols. Further information concerning the Microsoft Transaction Server environment can be found in DataBase Workshop: Microsoft Transaction Server 2.0, Roger Jennings ed., Sams Publishing, 1997, and also at the Microsoft Corporation web site.

Currently, MTS interoperability for heterogeneous hosts exists through Microsoft's COMTI (COM Transaction Interface) for IBM's IMS or CICS transactions, through third party ODBC (Open Data Base Connectivity) for connection to remote host's databases, or via the XA Mapper.

COMTI allows existing Cobol programs running on an IBM mainframe to be accessed by new window-based clients. ODBC allows access to various databases (Oracle, Informix, SQL Sequel server) by MTS components. The XA Mapper allows client applications that communicate with X/Open-compliant transaction managers to map their XA protocol to MTS's native OLE transaction protocols for inclusion of MTS controlled resources.

Unfortunately, these interoperability solutions exclude a large class of existing transaction processing systems— those that have been built according to the X/Open DTP model and that use the XATMI programming interface as the interface between an application program and a resource. Servers in these systems add business logic to control data bases which may be accessed by remote clients. The transaction managers in X/Open DTP-based systems control the coordination of transactions and the routing of messages. They also control rollback and recovery of data and synchronization of remote data managers.

The MS DTC, which provides the transaction manager function in an MTS environment, can not currently interoperate with resources on remote servers controlled by an X/Open XATMI-compliant transaction manager. The MS DTC is not XATMI-compliant. Servers controlled by XATMI-compliant transaction managers therefore cannot participate in global OLE transactions managed by an MS DTC. Given the large installed base of client/server applications that are built upon an X/Open XATMI-compliant transaction manager, it would be desirable to provide methods and apparatus that enable an MS DTC to include such servers in a global transaction that it controls. More broadly, it would be desirable to provide the ability for any transaction processing environment that does not employ an XATMI-compliant transaction manager to be able to access, as part of a global transaction in that environment, a resource on a remote server in another environment that does operate under the control of an XATMI compliant transaction manager. The present invention satisfies that need.

SUMMARY OF THE INVENTION

The present invention is directed to methods and apparatus that enable a component in a transaction processing environment to request, as part of a global transaction that is coordinated in that environment by a first transaction manager that is not XATMI-compliant, a resource on a remote server outside of that environment that is under the control of an XATMI-compliant transaction manager. As described hereinafter in greater detail, the methods and apparatus of the present invention are particularly useful for enabling a component in a Microsoft Transaction Server (MTS) environment to request, as part of a global transaction under the control of a Microsoft Distributed Transaction Coordinator (MS DTC) within the MTS environment, a resource on a remote server outside of the MTS environment that is under the control of an XATMI-compliant transaction manager. In a preferred embodiment, the methods and apparatus of the present invention are implemented in the form of an interconnect. The interconnect comprises a connection manager and a resource manager.

The connection manager comprises a protocol machine that communicates with a requested resource on the remote server in accordance with a bi-directional, two-phase commitment communications protocol. In the preferred embodiment, the protocol machine comprises an OSI TP protocol machine that implements the OSI TP Protocol Specification.

The resource manager has a first interface that receives XATMI service requests from the component and a second interface that receives directives (e.g., prepare, commit, abort, etc.) issued by the first transaction manger for a given global transaction. The resource manager (i) translates the XATMI service requests received from the component and the directives issued by the first transaction manager into corresponding service requests of the OSI TP protocol machine, (ii) issues the corresponding OSI TP service requests to the OSI TP protocol machine, and (iii) coordinates the processing of the OSI TP service requests by the OSI TP protocol machine with the processing of corresponding events (such as prepare, commit, and abort) in the transaction processing environment of the first transaction manager in a manner that is transparent to both the transaction processing environment of the first transaction manager environment and the remote server. This enables the remote server to appear to the first transaction manager and to the component as simply another local resource within their transaction processing environment. Moreover, in the preferred embodiment, by using an OSI TP protocol machine to communicate requests to the remote server, the interconnect of the present invention gains the benefits of the robust recovery features of the OSI TP Protocol Specification, which enhances the ability of the overall transaction processing system to satisfy the ACID properties. Also in the preferred embodiment, the resource manager operates under the control of a state machine that controls the operation of the resource manager on a branch-by-branch basis.

Each XATMI service request that requires a separate connection to the remote server represents a single branch of the global transaction. According to another feature of the present invention, the resource manager further operates to obtain from the transaction processing environment of the first transaction manager, a first identifier assigned to the global transaction within that environment, and to generate therefrom, a second identifier that is used to identify that transaction within the protocol machine of the connection manager. The resource manager also preferably generates, in addition to the second identifier, a third identifier that uniquely identifies the branch of the global transaction within the protocol machine. In the preferred embodiment, wherein the protocol machine of the connection manager comprises an OSI TP protocol machine, the second and third identifiers preferably comprise an atomic action identifier (AAID) and branch suffix thereto (BRID), respectively, in accordance with the requirements of the OSI TP Protocol Specification. When the present invention is employed in an MTS environment, the first identifier preferably comprises a globally unique identifier (GUID) assigned to the transaction by MTS.

According to yet another feature of the present invention, for each branch of the global transaction, the protocol machine establishes a connection to the remote server to process the service request for that branch and generates a fourth identifier that identifies the connection established for that branch. The fourth identifier is used to identify the connection in subsequent calls to the remote server over that connection.

According to still another feature of the present invention, the resource manager generates a record for each branch in which information relating to the branch is stored for use by the resource manager in coordinating the processing of service requests by the protocol machine of the connection manager with the processing of corresponding events in the transaction processing environment of the first transaction manager (e.g., the MTS environment). Information stored in the record for a given branch preferably comprises the first, second, third, and fourth identifiers described above. Other information may comprise pointers to certain objects that the resource manager must reference and indications of the state of the branch.

According to another feature of the present invention, for each branch of the global transaction, the resource manager further operates to store together, in a secure storage, information required by both the first transaction manager (e.g., MS DTC) and the protocol machine (e.g., OSI TP protocol machine) to recover from a failure. The information for a given branch is stored in the form of a log record. A pointer to the log record of a given branch is stored in the aforementioned record for that branch. By storing recovery information needed by both the first transaction manager and the protocol machine together in a single log record, and by providing a centralized means to access the log record (the pointer in the record created for the branch), recovery in one or both of the environments can be easily achieved.

In use, for example, in a Microsoft Transaction Server environment, and in accordance with a method of the present invention, when an MTS component issues an XATMI service request (e.g., tpcall, tpacall, or tpconnect) to the resource manager of the interconnect, requesting a resource on the remote server, the interconnect determines from MTS whether the MTS component is configured as requiring or supporting a transaction. Assuming that the MTS component is transactional, the resource manager translates the XATMI service request into a corresponding request of the OSI TP protocol machine and issues that request to the remote service via the protocol machine. When a successful reply is received, the resource manager automatically enlists that branch of the transaction with the MS DTC to ensure that the MS DTC provides notification to the resource manager of any commitment directives issued for the transaction. In connection with this process, the resource manager instantiates an object representing the transaction branch and containing methods that the MS DTC calls to issue directives for that branch. These methods implement at least a part of the functionality of the resource manager.

When the MS DTC issues a commitment directive (e.g. prepare, commit, abort) for a given branch by calling one of the aforementioned methods, the resource manager translates that MTS directive into a corresponding service request of the bi-directional, two phase commitment communications protocol (e.g., OSI TP) of the connection manager and issues that corresponding request to the protocol machine. The request is sent to the remote server and an XATMI-compliant transaction manager on the remote server directs the resource manager on the remote server to perform the required operation (prepare, commit or abort). When the operation is complete, the remote server will send an indication back to the resource manager of the interconnect of the present invention via the bi-directional, two-phase commitment communications protocol (e.g., OSI TP) implemented by the protocol machine of the connection manager. When the resource manager receives the indication from the protocol machine, it invokes a notification method provided by the MS DTC to notify the MS DTC that the requested operation has been completed. The interconnect of the present invention hides the complexities of the communications with the remote server from the MS DTC and MTS component, enabling the remote server to effectively appear as a local resource within the MTS environment.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 5 illustrates the contents of a CRM record created by the interconnect of FIG. 3 for a given branch of a global transaction, in accordance with the preferred embodiment of the present invention;

FIGS. 6A–D comprise a state table that controls the operation of the interconnect of the present invention, in accordance with the preferred embodiment;

DETAILED DESCRIPTION OF THE PREFERRED EMBODIMENT

Figure 1:
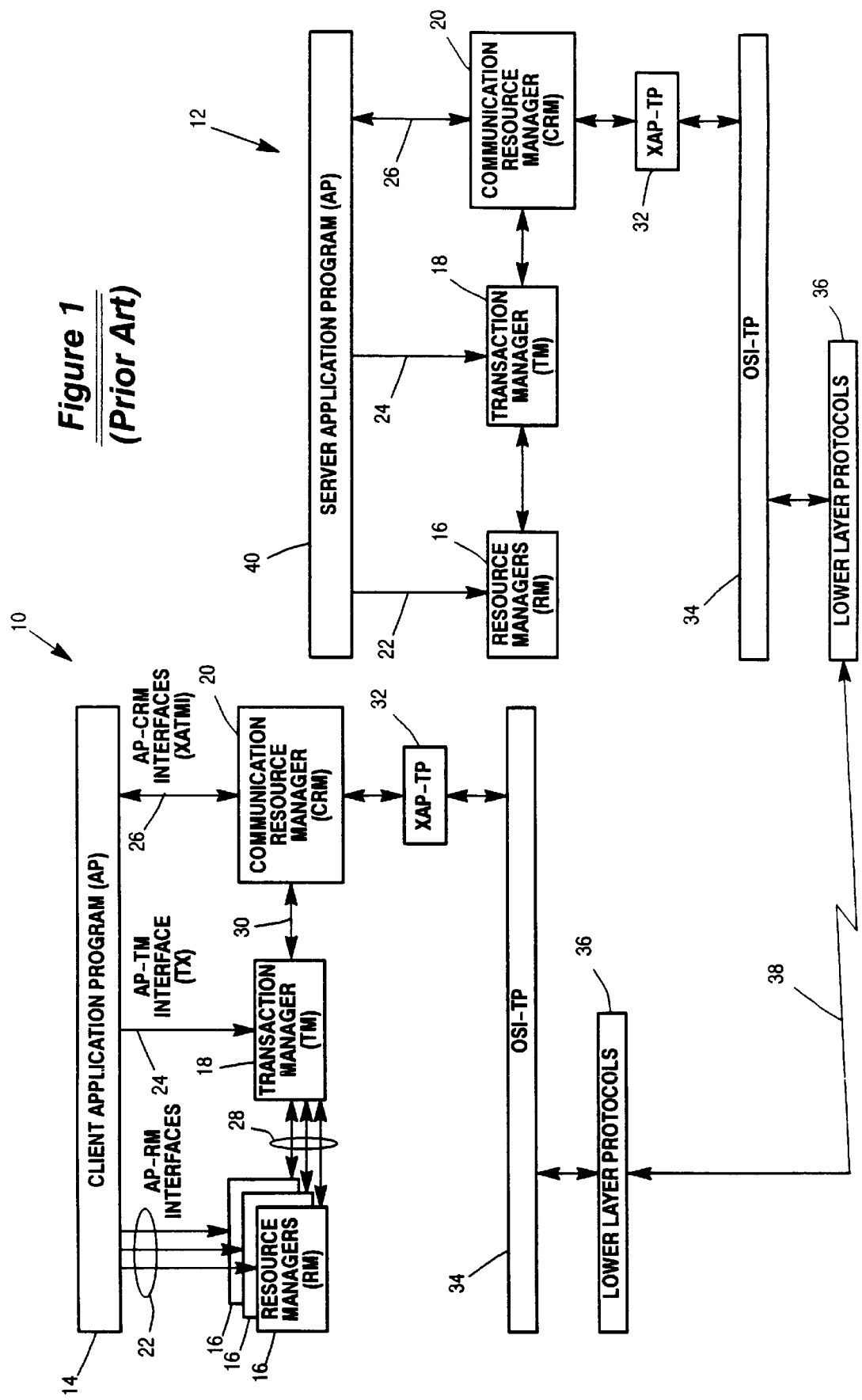
FIG. 1 is a block diagram illustrating the X/Open Distributed Transaction Processing (DTP) model architecture for distributed transaction processing systems.

I. Overview
II. Functional Block Diagram
　A. The Connection Manager
　B. The Resource Manager
　C. Other Data Structures/Objects
　D. State Machine
III. Connection Management/Coordination
　A. GUID-to-AAID/BRID Mapping
　B. TP_ID
IV. CRM Records
V. Logging for Recovery
　A. Process Failure
　B. Network Failure
　C. MS DTC failure
　D. NodeCrash
VI. Operation
　A. Start-Up: Initial Enlistment
　B. Processing of a Transaction Branch
　　1. Servicing an XATMI service request
　　2. Commitment Processing
　　3. Abort Processing
　C. Recovery
　I. Overview The present invention is directed to methods and apparatus that enable a component in a transaction processing environment to request, as part of a global transaction that is coordinated in that environment by a first transaction manager that is not XATMI-compliant, a resource on a remote server outside of that environment that is under the control of an XATMI-compliant transaction manager. As used herein and in the claims, an "XATMI-compliant transaction manager" means a transaction manager that operates in accordance with, or that supports or provides an interface that conforms to, the XATMI Specification, including any versions, predecessors, variations, or modified forms thereof, whether or not known by the same name. A preferred embodiment of the present invention is described hereinafter in which the methods and apparatus thereof are employed in a Microsoft Transaction Server (MTS) environment in which global transactions are coordinated by a Distributed Transaction Coordinator (MS DTC) within that environment. That is, the "transaction processing environment" and "first transaction manager", as those terms are used above and in the claims, comprise the MTS environment and its MS DTC, respectively. It is understood, however, that the methods and apparatus of the present invention are not limited to use in the MTS environment. Rather, the methods and apparatus of the present invention can be used in any transaction processing environment in which there is a need to request a resource on a remote server outside of that environment that is under the control of an XATMI-compliant transaction manager. Accordingly, the present invention is not limited to the particular embodiments described herein, but rather, is intended to cover all modifications that are within the spirit and scope of the present invention, as defined by the appended claims.

The methods and apparatus of the present invention may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 2:
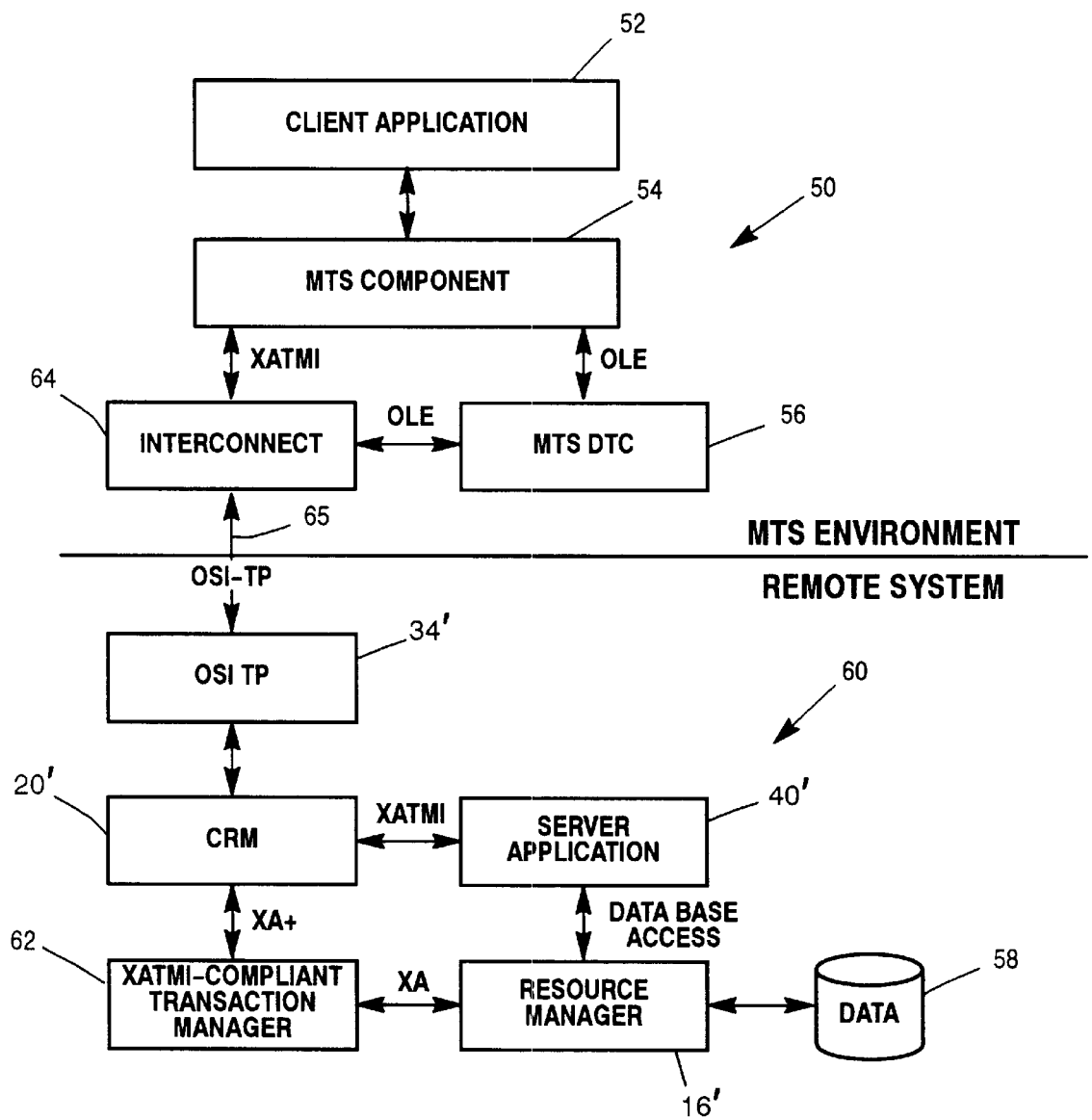
FIG. 2 is a block diagram illustrating a preferred embodiment of an interconnect that implements the methods and apparatus of the present invention, and illustrating an exemplary environment (a Microsoft Transaction Server environment) in which the present invention may be employed.

Referring to the drawings, wherein like numerals represent like elements throughout, FIG. 2 illustrates an exemplary Microsoft Transaction Server (MTS) environment 50 in which the present invention can be implemented. MTS is a runtime environment that executes under the Microsoft Windows NT operating system, and also, in a more limited fashion, under the Microsoft Windows 95 operating system. An MTS environment typically includes a client application 52, representing the first tier of a traditional three-tier transaction processing model. The client application 52 usually provides a user interface and may also perform some of the overall logic of the application. An application's business logic is implemented in the form of one or more MTS components (e.g., component 54). MTS components are written as single thread units, and the MTS executive handles any concurrency issues. A series of MTS components can be grouped into a package for easier deployment and use. An MTS component developer can configure an MTS component as either requiring or supporting a transaction. An MTS component that is so configured, will automatically join a transaction, if one is in progress, under the control of a Distributed Transaction Coordinator (MS DTC) 56 in the MTS environment. The MS DTC 56 controls the participation of MTS components in transactions and coordinates transaction commitment in accordance with a two-phase commitment process. MTS components can request resources from one or more resource managers (not shown) within the MTS environment. A resource manager controls access to a particular resource, such as a data base. In a typical MTS environment, the MTS component 54, the MS DTC 56, and one or more resource managers (not shown) communicate using OLE protocols.

In this embodiment, the methods and apparatus of the present invention enable the MTS component 54 to request, as part of a global transaction coordinated by the MS DTC 56 (which is not XATMI-compliant), a resource (e.g., data from database 58) on a remote server 60 that is under the control of an XATMI-compliant transaction manager 62 outside of the MTS environment. Such a remote server might be constructed, for example, in accordance with the X/Open DTP model, as is the remote server 60 of this example. That is, the remote server 60 is architected and operates in a manner similar to the exemplary server 12 of the X/Open DTP model system of FIG. 1. Remote servers of this type will communicate with other servers in accordance with some bi-directional two-phase commitment communications protocol, such as the OSI TP Protocol Specification.

In a preferred embodiment, the methods and apparatus of the present invention are implemented, as shown in FIG. 2, in the form of an interconnect 64. According to this embodiment of the present invention, the interconnect receives XATMI service requests (e.g., tpcall, tpacall, tpconnect, etc.)

from the MTS component via an XATMI interface, and receives directives for a given global transaction (e.g., prepare, commit, abort, etc.) from the MS DTC 56. As described hereinafter in greater detail, the interconnect 64 of the present invention translates these requests and directives into corresponding service requests of the bi-directional two-phase commitment communications protocol employed by the remote server 60 (e.g., the OSI TP Protocol Specification in this embodiment), and coordinates the processing of those service requests with the processing of corresponding events in the MTS environment. In this manner, the remote server 60 appears as a local resource to the MS DTC 56. The interconnect 64 communicates with the MS DTC 56 using the native OLE transaction protocol of the MTS environment. As used herein and in the claims, the terms "XATMI," "XATMI interface" and "XATMI service request" are intended to encompass the interface and service requests described in the XATMI Specification, as well as other versions, variations, predecessors, or modified forms thereof, whether or not known by the same name.

II. Functional Block Diagram

Figure 3:
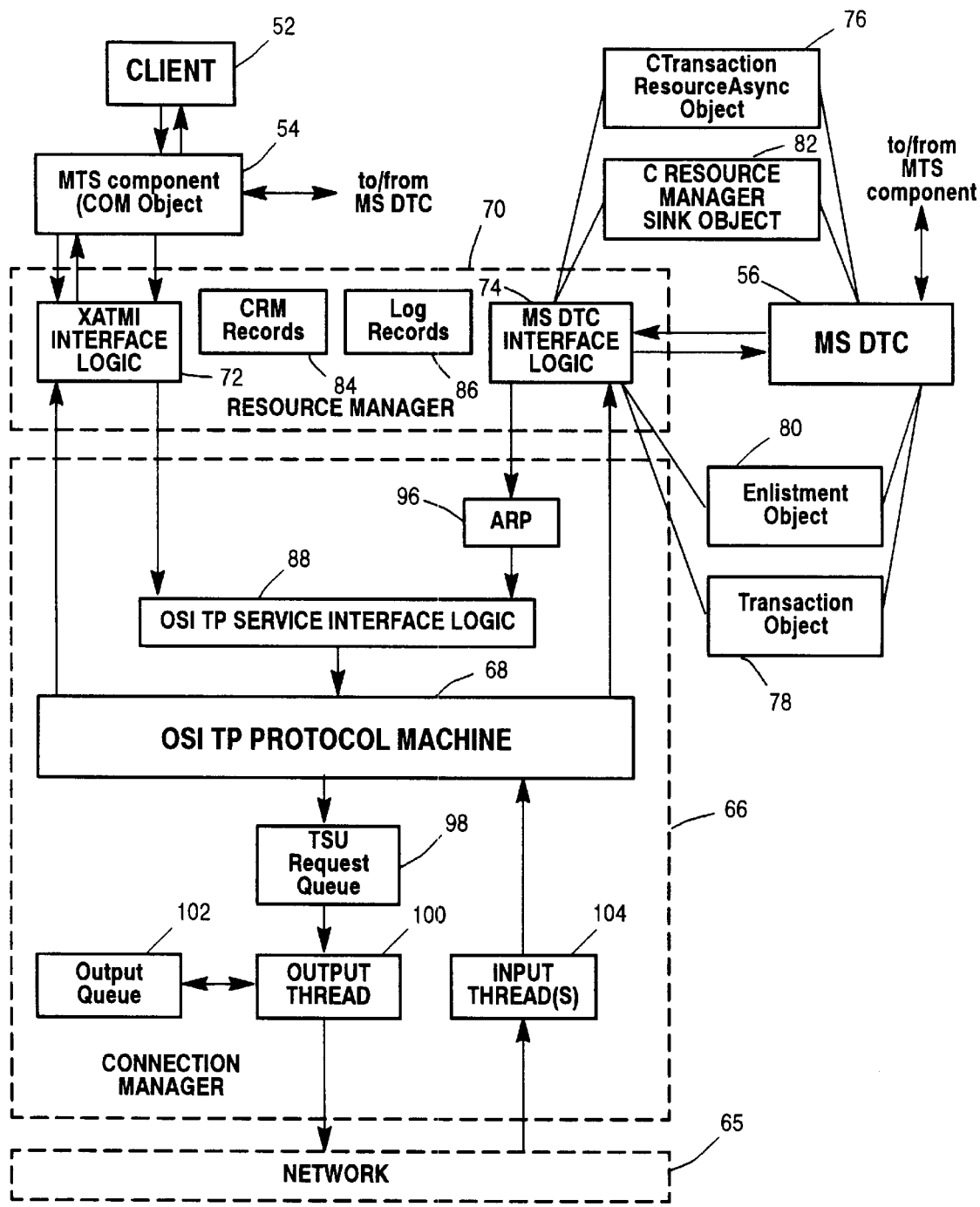
FIG. 3 is a block diagram providing further details of the interconnect of FIG. 2, in accordance with the preferred embodiment of the present invention.

FIG. 3 is a more detailed functional block diagram of the interconnect 64 of FIG. 2, in accordance with the preferred embodiment of the present invention. According to the preferred embodiment, the interconnect 64 comprises a connection manager 66 and a resource manager 70. In an MTS environment, a resource manager typically must provide automatic enlistment into a current transaction, and must manage all connections to the data store. An MTS-compliant resource manager must also define its own application programming interface (API) for access to the resource it controls. All access to the resource is done directly between the application and the resource manager. Any commitment or abort directives are coordinated through the MS DTC to enlisted resource managers. The resource manager 70 and connection manager 66 of the interconnect 64 of the present invention provide the automatic enlistment and connection management functions required by MTS.

A. The Connection Manager

According to the preferred embodiment, the connection manager 66 comprises a protocol machine 68 that communicates with a requested resource on the remote server 60 in accordance with a bi-directional, two-phase commitment communications protocol. In the preferred embodiment, the protocol machine 68 comprises an OSI TP protocol machine that implements the OSI TP Protocol Specification. Other bi-directional, two-phase commitment communications protocols include SNA LU 6.2.

In addition to the OSI TP protocol machine 68, the connection manager portion of the interconnect 64 of the present invention, further comprises OSI TP service interface logic 88, an output thread 100 with associated queues (98 and 102), one or more input threads 104, and an asynchronous request processor 96. The OSI TP protocol machine 68 may comprise a full implementation of the OSI TP Protocol Specification, in which case it is desirable for the OSI TP service interface logic 88 to implement the standard XAP-TP interface. Alternatively, in the preferred embodiment of the present invention, the OSI TP protocol machine 68 comprises the modified OSI TP protocol machine described in co-pending, commonly assigned, U.S. patent application Ser. No. 09/020,213, entitled "High Performance Distributed Transaction Processing Methods and Apparatus," which is hereby incorporated by reference in its entirety. Also in accordance with this preferred implementation, the OSI TP service interface logic 88 comprises the HPTPX interface described therein, rather than the standard XAP-TP interface.

In the present embodiment, the program code that implements the resource manager 70 (described below) and the program code that implements the connection manager 66 execute as separate software processes within the Microsoft Windows NT operating system that hosts the MTS environment. Consequently, in order for the resource manager 70 to issue service requests to the OSI TP protocol machine 68, an asynchronous request processor (ARP) 96 is implemented to queue such requests and to allow the requests to be processed asynchronously across the two software processes.

Communication between the OSI TP protocol machine and the remote server 60 is handled by the output thread 100 and one or more input threads 104. A TSU request queue 98 collects outgoing requests for processing by the output thread 100, which then sends the requests out to the network 65. An output queue 102 stores flow controlled data requests when the network 65 is congested.

B. The Resource Manager

The resource manager 70 has a first interface 72 that receives XATMI service requests from the MTS component 54 and a second interface 74 that receives directives (e.g. prepare, commit, abort, etc.) issued by the MS DTC 56 for a given global transaction. The resource manager 70 translates the XATMI service requests received from the MTS component 54 and the directives issued by the MS DTC 56 into corresponding service requests of the OSI TP service interface 88, which in the preferred embodiment comprises the HPTPX interface described in co-pending application Ser. No. 09/020,213, filed Feb. 6, 1998, pending, and which, in turn, issues corresponding OSI TP service requests to the OSI TP protocol machine 68. Replies and indications received by the OSI TP protocol machine 68 from the remote server 60 are similarly translated and communicated back to the MTS component 54 and MS DTC 56 as appropriate. Significantly, the resource manager 70 coordinates the processing of the OSI TP service requests by the OSI TP protocol machine 68 with the processing of corresponding events in the MTS environment (such as prepare, commit, and abort directives) in a manner that is transparent to both the MTS environment and the remote server 60. It is this capability that enables the remote server 60 to appear to the MS DTC 56 and MTS component 54 as simply another local resource within the MTS environment. Moreover, by using an OSI TP protocol machine to communicate requests to the remote server 60, the interconnect 64 of the present invention gains the benefits of the robust recovery features of the OSI TP Protocol Specification, which enhances the ability of the overall transaction processing system to satisfy the ACID properties.

The first interface 72 comprises interface logic that implements the XATMI interface in accordance with the XATMI Specification. This interface logic 72 handles buffer manipulation, encoding and decoding of data to and from the remote server 60, and setting up data and associated parameters for service requests to the OSI TP protocol machine 68 via the OSI TP service interface logic 88. The second interface 74 comprises logic to handle interactions with the MS DTC 56 and related objects (described hereinafter).

Each XATMI service request received from the MTS component 54 that requires a connection to the remote server 60 (e.g., tpcall, tpacall, tpconnect) is treated as a separate branch of the global transaction of which that request is a part. Specifically, as each such XATMI service request is received by the XATMI interface logic 72 and issued to the OSI TP protocol machine 68, the OSI TP protocol machine 68 treats it as a separate branch of the global transaction and makes a connection to the remote system for that branch. All activities relating to that branch are then sent over the established connection.

C. Other Data Structures/Objects

In accordance with the preferred embodiment of the present invention, the resource manager 70 of the interconnect 64 creates several objects and data structures, and also makes use of several objects created by MTS and the MS DTC 56.

Figure 4A:
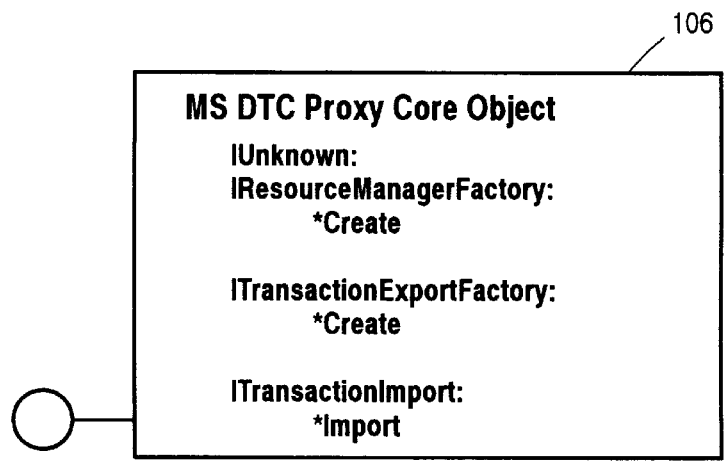
FIGS. 4A–G depict software objects that are created and/or accessed during operation of the interconnect of FIG. 3.
Figure 4B:
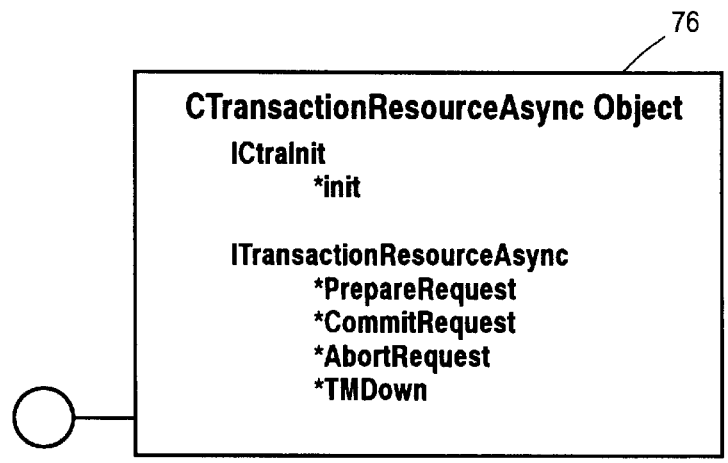
Figure 4C:
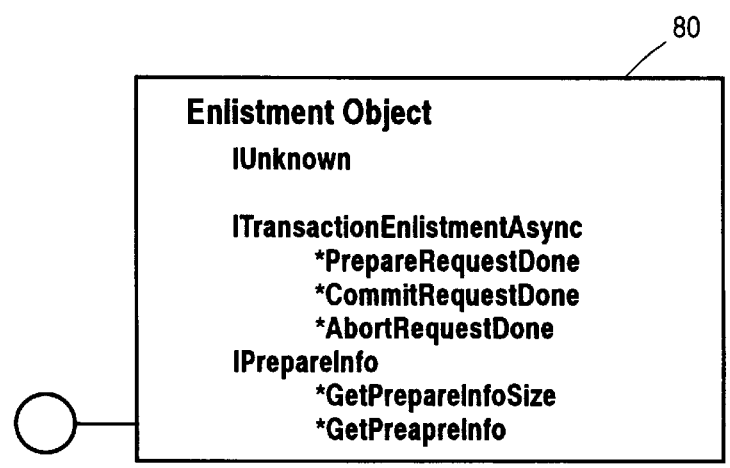
Figure 4D:
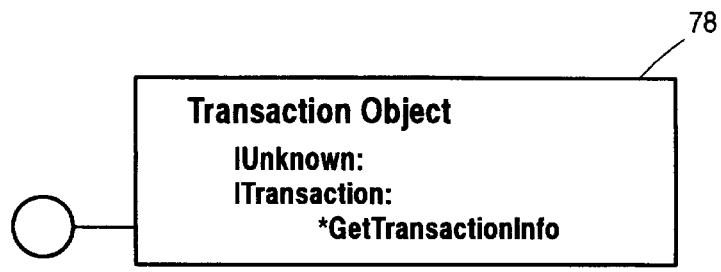

When an MTS component is instantiated, MTS creates a context object for the component, as mentioned above. FIG. 4G depicts an exemplary context object 79 created by MTS for the MTS component 54 of FIG. 3. The context object 79 exposes IUnknown, IObjectContext, and IObjectContextTransaction interfaces, as shown.

When an instantiated MTS component is configured as requiring or supporting a transaction, MTS also creates a Transaction object 78 (FIG. 4D) that represents the transaction for which that MTS component is attempting to perform work. More than one MTS component can perform work for a given transaction. The GetTransaction method of the IObjectContextTransaction interface of the context object of a given MTS component can be invoked to obtain a reference (i.e., pointer) to the Transaction object representing the transaction for which the component is performing work. If multiple MTS components perform work for the same transaction, the GetTransaction method of each will point to the same Transaction object. Once a pointer to the Transaction object 78 is obtained, a GetTransactionInfo method of the ITransaction interface of the Transaction object 78 can be invoked to obtain information about the transaction. For example, this information contains a globally unique identifier (GUID) that MTS assigns to the transaction to identify it within the MTS environment.

In addition to the foregoing objects, the MS DTC 56 creates an MS DTC Proxy Core object that exposes the following interfaces that other entities, including MTS components and resource managers, use to request certain services of the MS DTC: IUnknown, IResourceManagerFactory, ITransactionExportFactory, and ITransactionImport. An exemplary MS DTC Proxy Core object 106 is illustrated in FIG. 4A.

The IResourceManagerFactory interface of the MS DTC Proxy Core object 106 contains a Create method that is used by the resource manager 70 to create a Resource Manager object 108 that represents the active connection between the resource manager 70 and the MS DTC 56. The Create method of the IResourceManagerFactory interface is one of the methods that the resource manager 70 calls as part of its enlistment with the MS DTC (i.e., part of the process of declaring its existence to the MS DTC).

Figure 4E:
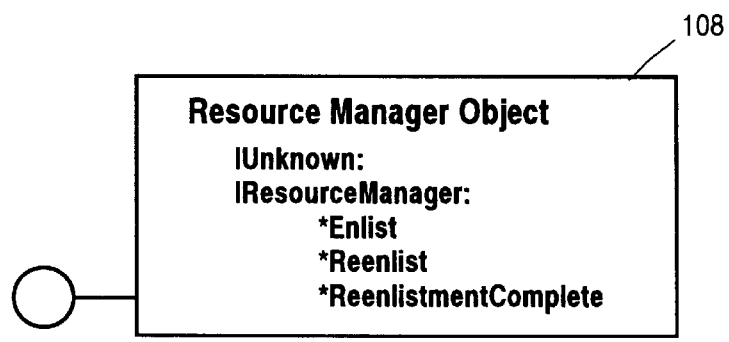

The Resource Manager object 108, shown in FIG. 4E, exposes an IUnknown interface and an IResourceManager interface. The IResourceManager interface of the Resource Manager object 108 provides an Enlist method, a Reenlist method, and a ReenlistmentComplete method. The Enlist method is invoked by the resource manager 70 to enlist a particular branch of a global transaction with the MS DTC 56. The Reenlist method is invoked by the resource manager 70 to reenlist with the MS DTC 56, for example, after a failure. The ReenlistmentComplete method is invoked during recovery after all in-doubt transaction branches have been recovered.

The ITransactionExportFactory interface of the MS DTC Proxy Core object 106 contains a Create method that is called by the resource manager 70 to create an export object (not shown). Export objects are used to propagate information between different processes. In the present embodiment, the resource manager 70 and connection manager 66 execute as separate processes. The export object is used to propagate information between these two processes. The Import method of the ITransactionImport interface of the MS DTC Proxy Core object 106 is also used for this purpose. Specifically, it is used to obtain transactional information that has been previously exported via the export object.

Figure 4F:
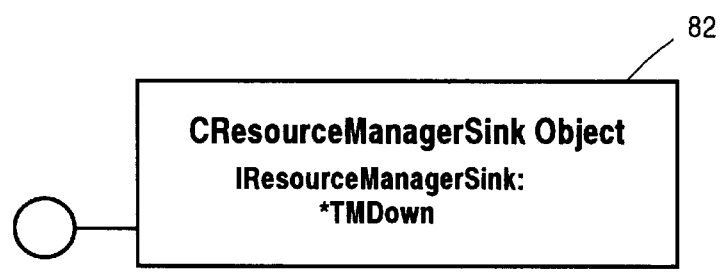
Figure 4G:
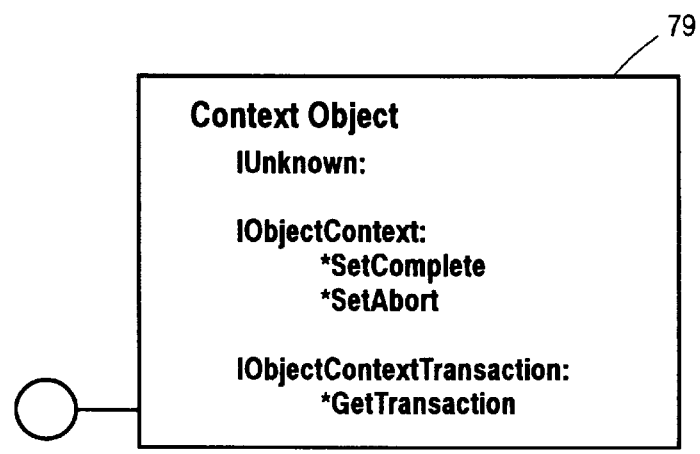

In addition to the Resource Manager object 108 that is created when the resource manager 70 enlists with the MS DTC 56 at startup, the resource manager 70 also creates a CResourceManagerSink 82 object in order to provide the IResourceManagerSink interface required by MTS (FIG. 4F). The IResourceManagerSink interface provides a TMDown method. TMDown is a callback method that the MS DTC 56 calls in the event of a failure of the MS DTC 56. This informs the resource manager 70 that it must perform recovery.

When the resource manager 70 calls the Enlist method of the IResourceManager interface of the Resource Manager object 108 to enlist a given transaction branch with the MS DTC 56, the resource manager 70 also creates a CTransactionResourceAsync object 76 in order to provide the MS DTC 56 with the ability to issue directives (e.g., prepare, commit, abort, etc.) to the resource manager 70 relating to the transaction of which that branch is a part. Specifically, as shown in FIG. 4B, the CTransactionResourceAsync object 76 exposes an ITransactionResourceAsync interface that contains the following methods: PrepareRequest, CommitRequest, AbortRequest, and TMDown. The PrepareRequest, CommitRequest, and AbortRequest methods are callback methods implemented by the resource manager 70 that the MS DTC 56 invokes to issue commitment directives (prepare, commit, abort) to the resource manager 70 for the enlisted transaction branch. The TMDown method, like the TMDown method provided by the IResourceManagerSink interface of the CResourceManagerSink object 82, is used by the MS DTC 56 in the event of a failure to inform the resource manager 70 that it must perform recovery. Much of the functionality of the present invention is implemented in the PrepareRequest, CommitRequest, AbortRequest, and TMDown methods of the CTransactionResourceAsync object 76.

The CTransactionResourceAsync object 76 also exposes an ICtraInit interface that provides an Init method. The Init method stores an identifier (crm_id) associated with a CRM record (described hereinafter) for the branch within the CTransactionResourceAsync object 76. As described hereinafter, whenever the MS DTC 56 invokes any of the PrepareRequest, CommitRequest, AbortRequest, or TMDown methods of the CTransactionResourceAsync object 76, the crm_id is retrieved from the object and used internally to the interconnect 64 to identify the particular branch for which that method has been invoked.

In addition to the CTransactionResourceAsync object 76 created by the resource manager 70 when it enlists with the MS DTC 56 for a given transaction branch, the MS DTC 56 likewise creates an Enlistment object 80 associated with that branch (FIG. 4C). The Enlistment object 80 exposes an ITransactionEnlistmentAsync interface and an IPrepareInfo interface. The ITransactionEnlistmentAsync interface provides methods by which the resource manager 70 informs the MS DTC 56 when it has completed certain aspects of the two-phase commitment process for a given transaction branch. Specifically, the ITransactionEnlistmentAsync interface provides a PrepareRequestDone method that the resource manager 70 invokes to inform the MS DTC 56 that it has completed a PrepareRequest issued by the MS DTC 56, a CommitRequestDone method that the resource manager 70 invokes to inform the MS DTC 56 that it has completed a CommitRequest issued by the MS DTC 56, and an AbortRequestDone method that the resource manager 70 invokes to inform the MS DTC 56 that it has completed an AbortRequest issued by the MS DTC 56. The IPrepareInfo interface provides a GetPrepareInfoSize method and a GetPrepareInfo method that are used by the resource manager 70 to obtain information about the transaction branch during the prepare phase of commitment. As described hereinafter, this recovery information is stored in a secure storage along with recovery information associated with the OSI TP protocol machine to enable recovery in both environments in the event of a failure.

In addition to the objects described above, for each branch of a global transaction (i.e., each XATMI service request received from the MTS component 54 for which the OSI TP protocol machine 68 establishes a separate connection to the remote server 60), the resource manager 70 of the interconnect 64 of the present invention creates a record, referred to herein as a CRM record, in which information relating to that branch is stored for use by the resource manager 70 in coordinating the processing of OSI TP service requests by the OSI TP protocol machine 68 with the processing of corresponding events in the MTS environment. CRM records for a number of branches are stored by the resource manager 70 in the form of a linked list 84. The CRM records 84 serve as a central repository for all transactional and connection based information for each transaction branch. Further details concerning the structure and contents of a CRM record are provided hereinafter.

In addition to the CRM records, the resource manager 70 creates log records 86 for each branch that contain recovery information. Specifically, in accordance with another feature of the present invention, for each transaction branch, the resource manager 70 stores together, in a secure storage, information required by both the MS DTC 56 and the OSI TP protocol machine 68 to recover from a failure. Additional details concerning the storage of recovery information for both environments are provided hereinafter.

D. State Machine

According to the preferred embodiment of the interconnect 64 of the present invention, the resource manager 70 operates in accordance with a state machine that controls the overall operation and coordination that the resource manager 70 performs among the MTS component 54, the MS DTC 56, and the OSI TP protocol machine 68 in processing a branch of a global transaction. FIGS. 6A–6D describe the operation of the state machine.

The following states are defined for each branch of a transaction:

0—FINITO: this state indicates that a transaction does not exist for the branch. This is the initial state for the branch. An XATMI dialogue state may exist.

1—XTR-DIAGACT: this state indicates a dialogue for a potential transaction has been initiated. An XATMI indication is awaited. If the connection to the remote server 60 is successful, the resource manager 70 will automatically enlist the branch with the MS DTC 56.

2—ENLISTING: this state is entered when an XATMI tpcall, tpacall, or tpconnect service request (representing a transaction branch) has been accepted, and the resource manager 70 is required to enlist the branch with the MS DTC 56.

3—ENLISTED: this state indicates that the branch has been successfully enlisted with MS DTC 56. The resource manager 70 will be notified of any prepare, commit, or abort directives issued by the MS DTC 56.

4—PREPARING: this state is entered after a PrepareRequest directive has been received from the MS DTC 56 (i.e., the MS DTC 56 has called the PrepareRequest method of the CTransactionResourceAsync object 76). A ready_indication is awaited from the OSI TP protocol machine 68.

5—PREPARED: this state is entered when a Ready Indication has been received from the OSI TP protocol machine 68 in response to the processing of the PrepareRequest. The log record for this branch is created and stored in secure storage. The resource manager 70 awaits the receipt of a commit or abort directive from the MS DTC 56 (i.e., waits for the MS DTC 56 to invoke either the CommitRequest or AbortRequest method of the CTransactionResourceAsync object 76).

6—COMMITTING: this state is entered after the MS DTC 56 invokes the CommitRequest method of the CTransactionResourceAsync object 76. The resource manager 70 awaits a Commit Complete Indication from the OSI TP protocol machine 68.

7—ABORTING: this state is entered after the MS DTC 56 invokes the AbortRequest method of the CTransactionResourceAsync object 76. The resource manager 70 awaits a Rollback Complete Indication from the OSI TP protocol machine 68.

8—RECOVERING: if any branch is determined to be in-doubt after a failure, the branch enters this state. The reenlistment status returned by the MS DTC 56 will direct either a rollback or commit to be performed, and that will determine the next state.

Referring to FIGS. 6A–6D, the table shown specifies how the resource manager 70 changes state on a given branch depending on a given event that occurs and the variables associated with it. For example, the first row of the portion of the table shown in FIG. 6A specifies the actions to be taken and the next state to be entered when an xatmi_call req (tpcall) is received from the MTS component 56 on a branch that is currently in state 0 (FINITO). As shown, the actions performed depend upon the status of a variable called mtran. Actions to be performed are shown in brackets. In this case, if the mtran variable is set when the tpcall event occurs, the actions [createCrm], [getAAID], [CallRq], and [GetrplyRq] will be performed and the resource manager 70 will enter state 1 (XTR_DIAGACT) for the branch. The meaning of these variables and actions are provided below. Events include those initiated by the XATMI interface logic 72, the OSI TP protocol machine 68, and the MS DTC 56. The state table of FIGS. 6A–6B specifies the actions to be taken upon the occurrence of any of these events given the current state a transaction branch.

The intersection of an incoming event (row) and a state (column) forms a cell. A subcell is a subset of a cell enclosed in a box. The elements of a subcell are the following (given in their order of appearance in the subcell): (a) optionally a variable expression; (b) zero or more actions; and (c) a resultant state. A blank cell, a non-existent cell for an event, or a cell with no subcells for which the evaluation of the variable expression is true, represents an invalid event for that state. A cell with a subcell for which the evaluation of the variable expression is true represents a valid event for that state. Incoming events are represented by their name, with one or more attributes. States are specified by a number in a cell, but are listed by both number and name along the top of each column. "^" means "not" and is applied to variables. "=" means "equal to" and is also applied to variables. "HTP" refers to the OSI TP protocol machine implementation used in accordance with the preferred embodiment of the present invention, which as described above, comprises the modified OSI TP protocol machine described in co-pending application Ser. No. 09/020,213 and its associated HPTPX service interface.

The state machine uses variables to keep track of certain information. The variables used are of type integer. There are two categories of variables: (1) MTS related variables (which begin with letter "m") that are specific to information relating to MTS objects, and (2) XATMI related variables (which begin with letter "x") that are specific to information relating to the XATMI interface. In the present embodiment, the following variables are defined:

| | |
|---|---|
| xtperrno | indicates value of TPERRNO return code; |
| mtran | object is transactional; |
| menlist | automatic enlistment of object is successful; |
| mdone | flag to indicate the abort request is done and no response is awaited. |

Actions are presented in the state table cells between brackets ("[ ]"). For each valid incoming event, all applicable actions are taken. In the present embodiment, the following actions are defined:

| | |
|---|---|
| [createCrm] | create CRM record and initialize fields; |
| [removeCrm] | delete the CRM record; |
| [getAAID] | using GUID, map to AAID for input to OSI TP; |
| [CallRq] | Issue hptpx__callcon__req with correct AAID and encoded XATMI data; |
| [AbortRq] | Issue hptpx__abort__req; |
| [PrepareRq] | Issue hptpx__prepare__req; |
| [CommitRq] | Issue hptpx__commit__req; |
| [RollbackRq] | Issue hptpx__rollback__req; |
| [AbandonRq] | Issue hptpx__abandon__req; |
| [GetrplyRq] | Issue tpgetreply command to XATMI component; |
| [enqueueMsg] | places OSI TP indication on crm msg queue for later retrieval; |
| [PassXATMI] | passes the result from OSI TP to XATMI; |
| [DeliverInd] | call hptpx__deliverind to get indication from remote server; |
| [MTSEnlist] | enlist this transactional object with MS DTC; |
| [icPrepare] | pass ic__prepare to the asynchronous request queue; |
| [icCommit] | pass ic__commit to the asynchronous request queue; |
| [icRollback] | pass ic__rollback to the asynchronous request queue; |
| [PrepReqDone] | issue PrepareRequestDone with S__OK set to MS DTC; |
| [ComReqDone] | issue CommitRequestDone with S__OK set to MS DTC; |
| [AbortReqDone] | issue AbortReqeustDone with S__OK set to MS DTC; |
| [PrepReqDoneF] | set E__FAIL and issue PrepareRequestDone to MS DTC; |
| [loghaz] | check for log hazard condition returned from OSI TP, and log it for administrator; |
| [logforget] | delete log from secure storage; |
| [securelog] | From MTS get the PrepareInfo structure, Secure on stable storage the PrepareInfo structure and the OSI-TP log structure. |
| [CountComp] | Decrement the count for each complete indication received. When the count is 0, send the reenlistment complete to MS DTC. |

III. Connection Management/Coordination

The interconnect 64 of the present invention takes advantage of the OSI-TP association manager functionality to manage connections to the remote server 60 as a pool of resources. The association management functionality of OSI TP keeps track of dialogues and associations used for recovery. This functionality controls connections using the "pools by inference" method. Connections are established on an as needed basis and held until a time-out occurs. Multiple connections between systems can be maintained simultaneously. OSI TP allows connection to multiple systems as required by different MTS components running simultaneously.

A. GUID-to-AAID/BRID Mapping

Both the OSI-TP Protocol Specification and the OLE Transaction Protocols supply a method to preserve the atomicity of a transaction. For OSI-TP, the atomic action identifier (AAID) is used as a unique identifier for the transaction. Transaction branches referenced with the same AAID are committed or rolled back as a group. In addition, the OSI TP Protocol Specification specifies a branch suffix (BRID) for each branch that is used to identify that branch of the transaction. For OLE, a globally unique identifier (GUID) is used to identify a transaction within the MTS environment. The GUID is obtained via a Win32 API function call. This value ensures that each transaction will have a unique identifier within the MTS environment.

According to an important feature of the present invention, when an XATMI service request that requires a connection to the remote server 60 is received from an MTS component 54, the resource manager 70 obtains from the Transaction object 78 associated with the MTS component 54 (using the GetTransactionInfo method), the GUID that identifies the transaction to which the request relates. The resource manager 70 then determines from an internal table whether a corresponding AAID has already been generated for this GUID. If not, the resource manager 70 generates an AAID that is then used to identify the transaction within the OSI TP protocol machine 68. Both the GUID and the generated AAID are stored in the CRM record for a given transaction branch to provide a mapping from the GUID to the AAID and back, so that the services referenced on the remote server 60 are kept in sync with those in the MTS environment.

The OSI TP Protocol Specification requires that an AAID consist of an ASN.1 encoded local AE-TITLE as the "masters-name" component and a locally defined unique AE-suffix. According to the preferred embodiment of the present invention, an AAID generated from a GUID comprises a local AE-TITLE as the "masters-name" component and the 16 byte GUID as the OCTET STRING form of the "atomic-action-suffix" component.

The resource manager 70 also creates a branch suffix (BRID) for the branch. As defined in the OSI TP Protocol Specification, a branch suffix is either an encoded octet string or an encoded integer. According to the present invention, the branch suffix is created by converting an integer to an ASCII representation of the integer, and then using the converted integer as the contents-octets of the octet string form of the encoded branch suffix. The integer is obtained from a counter that is initialized to one ("1") when an AAID is created from the GUID and incremented by one ("1") whenever the AAID is searched based on the same GUID. This in effect counts the number of branches for the transaction. The encoded integer reflects the current branch count for the transaction represented by the GUID and AAID. In this embodiment, the GUID, AAID, and branch suffix(BRID) represent first, second, and third identifiers, respectively.

The resource manager 70 translates an XATMI service request received from the MTS component into a corresponding OSI TP service request (e.g., HTPX__CALLCON__REQ) and passes the request to the OSI TP protocol machine 68 along with the generated AAID and BRID. The OSI TP protocol machine 68 will then establish a connection to the remote server 60. In the event of a lost network connection or a node crash, the AAID and BRID can be retrieved from the CRM record for the branch and used to reestablish the connection with the remote server 60.

Because a given transaction can have multiple branches, and thus the same GUID/AAID mapping, the first time an AAID is generated for a GUID in accordance with the method described above, the GUID/AAID combination is stored in an internal table (not shown). Whenever an XATMI service request representing a branch of a transaction is received, the resource manager 70 first determines from the internal table whether an AAID has already been generated for the GUID associated with that transaction. If so, then only a branch suffix (BRID) needs to be generated for the branch. If this is the first branch of the transaction, however, then both the AAID and branch suffix (BRID) are generated.

B. TP_ID

According to another feature of the present invention, for each XATMI service request received from the MTS component 54 that requires a connection to the remote server 60 (i.e., each branch of the transaction), the resource manager 70 generates a fourth identifier ("tp_id") that associates that branch with the connection established by the OSI TP protocol machine 68 for that branch. The tp_id is returned to the MTS component 54 upon the successful completion of the XATMI service request that establishes the connection. The tp_id is also stored in the CRM record for the branch. For subsequent processing on the established connection, the tp_id is used as an index into a data structure (not shown) within the OSI TP protocol machine 68 that has an entry for each branch of a transaction. For a given branch, the entry in this data structure specifies the particular resources within the OSI TP protocol machine that have been allocated to the established connection. In the present embodiment, a given entry in the data structure specifies (i) the crm_id that points back to the branch's CRM record and, as mentioned above, is also stored in the CTransactionResourceAsync object 76, (ii) a SACF index that points to a data structure representing the established connection, and a Branch index that points to OSI TP-related information for the branch. Other implementations of the OSI TP protocol machine may use different data structures to achieve the same purpose, but in all such embodiments contemplated herein, the tp_id is used as the means to identify the resources allocated within the OSI TP protocol machine 68 to establish a connection to the remote server 60 for a given transaction branch.

In the present embodiment, the tp_id and crm_id are used together to identify a particular branch as communications move back and forth between the OSI TP protocol machine 68, the XATMI interface logic 72, and the MS DTC 56. Specifically, whenever the XATMI interface logic 72 needs to reference an established connection, it uses the tp_id to specify that particular connection. When the OSI TP protocol machine 68 receives replies and indications for a particular branch, it uses the crm_id in its internal data structure to provide a pointer to the CRM record for the branch so that additional information about the branch can be obtained. Thus, the tp_id, crm_id, and CRM record for a given branch serve as a means to maintain the identity of a branch among the XATMI interface logic 72, the OSI TP protocol machine 68, and the MS DTC 56 (via interface logic 74). This ties the various environments together in a manner that is transparent to the entities that interact with the interconnect 64 of the present invention.

IV. CRM Records

As mentioned above, according to another feature of the present invention, for each XATMI service request that represents a separate branch of a global transaction, the resource manager 70 creates a record for the branch, referred to herein as a CRM record, in which information relating to the branch is stored for use by the resource manager 70 in coordinating the processing of OSI TP service requests by the OSI TP protocol machine 68 with the processing of corresponding events in the MTS environment. The CRM record allows access to all transactional and connection based information for a given transaction branch. For example, as mentioned above, the CRM record is used to store the GUID, AAID, BRID, and tp_id for a given branch. Such data is centralized in this record so that it can be accessed from multiple processes within the interconnect 64. All information needed for recovery in both the MTS environment and the OSI TP protocol machine 68 is maintained in the record. A group of CRM records representing multiple branches of a given transaction are maintained in a linked list. The crm_id for a given branch is used to identify the CRM record for that branch within the linked list.

FIG. 5 shows the contents of a CRM record for a given branch in accordance with the preferred embodiment of the present invention. As shown, the crm_id for the branch points to the CRM record. A next field contains a pointer to the next CRM record in the linked list, and a prev field contains a pointer to the previous record. A diagstate field is used by the XATMI interface logic 72 of the resource manager 70 to store an indication of the XATMI state of a given dialogue. A txstate field is used to store the current state of the branch (i.e., the particular state of the state machine of FIGS. 6A–6B). A msg_q field contains a pointer to a message queue buffer that is used to store data passed between the MTS component 54 and the OSI TP protocol machine 68. Specifically, the msg_q buffer holds messages that arrive from the network via the OSI TP protocol machine 68 until the MTS component issues an XATMI service request (e.g., tpgetrply) to receive the data. The XATMI interface logic 72 uses the msg_q pointer in the CRM record to retrieve the data from the buffer and pass it to the MTS component 54. A svcname field contains the name of the XATMI service on the remote server 60 that the MTS component has called. An enc_type field specifies the XATMI encoding/decoding rules for carray, string, and chartranslate data types that the XATMI interface logic 72 follows during encoding/decoding of XATMI service requests. A recip_ae field is used to identify the remote server 60. A *EnlistObj field contains a pointer to the Enlistment object 80 created by the MS DTC 56 when the resource manager 70 enlists the branch with the MS DTC 56. A *ExportObj field contains a pointer to the Export object 80 created by the resource manager 70. A *TransObj field contains a pointer to the Transaction object 78 associated with the MTS component 54. A *Transcookie field contains a pointer to a transaction cookie that is used when transferring information about the transaction between processes via an export object. A TransCookieLen field contains a value that specifies the length of the transaction cookie in bytes. A tp_id field contains the tp_id for this branch. An mts_guid field contains the GUID used in the MTS environment to identify the transaction of which this branch is a part. An aaid/brid field contains the AAID and branch suffix(BRID) generated from the GUID in accordance with the method described above. A *pPrepInfo field contains a pointer to the information that the resource manager 70 obtains from the MS DTC 56 during the prepare phase of commitment and stores in the secure storage as part of a log record for the branch. This information is used for recovery purposes. A *log_rec field contains a pointer to the log record.

V. Logging for Recovery

According to another feature of the present invention, for each branch of a transaction, the resource manager 70 stores together, in a secure storage, information needed for both the MS DTC 56 and the OSI TP protocol machine 68 to perform recovery in the event of a failure. That is, the resource manager 70 ties together the data structures needed for recovery by both the OSI TP protocol machine 68 and the MS DTC 56. All of the necessary recovery information (OSI TP and MS DTC) is stored in the form of a log record for the branch. Specifically, the log record for the branch comprises the PrepareInfo data structure received from the MS DTC 56 during the prepare phase of a transaction, the PrepareInfo structure size, a structure to hold the OSI TP recovery information (including the recip_ae identifier, the AAID, and the BRID), and the crm_id of the branch (which points to the CRM record of the branch). A pointer to the log record of a given branch is stored in its CRM record, as mentioned above.

Log records are saved to secure storage using the Istream COM interface. The IStorage COM interface is used to maintain the log records in a single file. Both interfaces are implemented within the Windows NT operating system. Upon startup of the interconnect 64 after a failure, the log record of a given branch whose state of commitment is in-doubt is retrieved from the secure storage. The information needed for OSI TP recovery is transmitted to the OSI TP protocol machine 68, whereas the PrepareInfo structure is transmitted to the MS DTC 56. In this way, the entire transaction system remains synchronized.

In greater detail, recovery is necessary whenever a failure occurs between the time a resource manager receives a prepare request and the time the transaction manager receives an indication that commitment has been completed successfully. A failure during this time will leave certain branches of a transaction in-doubt. There are four types of failures that can occur: process failure, network failure, transaction manager failure and node crash. Using the stored recovery information for both the OSI TP protocol machine 68 and the MS DTC 56, the interconnect 64 of the present invention enables both entities to recover from these types of failures in order to preserve transaction durability, as follows:

A. Process Failure

To ensure durability of a transaction through process failure, the interconnect 64 of the present invention detects when a process of an MTS component has ended by using a cleanup thread (not shown) running in the connection manager 66. This thread periodically checks to see if any MTS component process has prematurely ended. If so, it calls an "XATMI_CLEANUP" event, as shown in the state table (see FIGS. 6B and 6D), which aborts the current transaction. If the premature ending of the MTS component is due to the occurrence of a timeout in the MTS environment, and if the resource manager 70 has enlisted the transaction branch with the MS DTC 56, the MS DTC 56 will provide notification of the failure. This notification is by way of the AbortRequest method, also shown in the state table (see FIG. 6C), which the resource manager 70 handles in a manner similar to the XATMI_CLEANUP event.

B. Network Failure

To ensure durability of transactions through network failure, the interconnect 64 of the present invention relies upon built-in mechanisms of the OSI-TP protocol machine 68. Specifically, by way of the OSI TP protocols implemented by the OSI TP protocol machine 68, associations are automatically recovered when a failure between systems or on the network occurs. The connections are reestablished as channels, to preserve the outcome of the transaction. No outcomes are ever lost and the connection manager 66 thus enhances the durability attribute of the ACID properties within the MTS environment. The OSI TP protocol machine 68 directs the association manager functionality of the OSI TP Protocol Specification to reestablish communication with a remote host. The OSI-TP protocol machine 68 then resets its transaction state so that commitment of the transaction can complete. This is handled through OSI TP whenever a Provider Abort Indication is received (which is generated by lower layer network protocols when a network failure occurs). The MS DTC 56 knows nothing of the communication failure and waits patiently for the transaction to be marked as complete. The OSI TP protocol machine 68 notifies the resource manager 70 of the outcome of the transaction, and, in turn, the resource manager 70 notifies the MS DTC 56 of the outcome of the transaction by invoking the appropriate method of the ITransactionEnlistmentAsync interface of the Enlistment object 80.

C. MS DTC failure

To ensure durability of transactions through MS DTC failure, the resource manager 70 relies upon the information in the PrepareInfo structure that it saves in the log record for the branch. As described below in more detail, the resource manager 70 obtains the PrepareInfo structure from the MS DTC after the first phase (i.e., the prepare phase) of the two-phase commitment process is complete, and then stores it in the log record, along with OSI TP recovery information, and the crm_id for the branch. This information can be retrieved from secure storage after a failure so that the transaction branch can later be recovered if necessary.

In greater detail, when the MS DTC 56 experiences a failure, it first notifies all enlisted transaction branches by invoking their respective TMDown callback methods, and then notifies all participating resource managers by invoking their TMDown methods. In accordance with the preferred embodiment of the present invention, the TMDown callback method for each transaction branch that the resource manager 70 has enlisted with the MS DTC 56 is implemented in the CTransactionResourceAsync object 76 for that branch. The TMDown callback method of the resource manager 70 is implemented in the CResourceManagerSink object 82.

When the resource manager 70 receives a TMDown, the resource manager 70 goes into reenlistment. A timer thread (not shown) determines when reenlistment should be retried. The timer thread is implemented as a linked list of events that are periodically checked to see if the events are ready to be harvested. When the reenlistment event expires, an event will be enqueued to the ARP 96, which will retry the reenlistment. If the MS DTC 56 is still unavailable, another timer event will be enqueued and the process repeated until success. When the MS DTC 56 becomes available, the PrepareInfo structure for each branch that is in-doubt is transmitted to the MS DTC 56 using the Reenlist method of the Resource Manager object 108. The MS DTC 56 will then return the outcome of the branch (commit or abort) to the resource manager 70. Depending on the outcome received (commit or abort), the resource manager 70 then issues a corresponding OSI TP service request to the OSI TP protocol machine 68 so that the commitment process is completed by the OSI TP protocol machine 68. The outcome in both the OSI TP environment and the MTS environment are therefore synchronized.

D. Node Crash

To enable recovery from a node crash, the resource manager 70 employs the OSI TP recovery information in the log record for each branch. This information allows the OSI TP protocol machine 68 to reset its internal state tables to the states in existence at the time of the failure, as dictated by the OSI TP Protocol Specification. This guarantees durability of the transaction within the OSI TP protocol machine 68. The resource manager 70 will also pass the PrepareInfo structure to the MS DTC 56 using the Reenlist method of the Resource Manager object 108. The MS DTC 56 will then return the outcome of the branch (commit or abort) to the resource manager 70. Depending on the outcome received (commit or abort), the resource manager 70 then issues the corresponding OSI TP service request to the OSI TP protocol machine 68 so that the commitment process is completed by the OSI TP protocol machine 68. The outcome in both the OSI TP environment and the MTS environment are therefore synchronized.

VI. Operation

FIGS. 7, 8A–C, and 9A–I, in conjunction with the following discussion, provide further details of the operation of the interconnect 64 of the present invention, and illustrate various methods of the present invention. The sequence of steps illustrated in these Figures is governed in large part by the state table of FIGS. 6A–6D, which as explained above, is the mechanism by which the operation of the interconnect 64 is controlled.

A. Start-Up: Initial Enlistment

Upon startup, the resource manager 70 enlists with the MS DTC 56. As used in this context, the term "enlist" means to identify the existence of the resource manager 70 to the relevant transaction manager, in this case the MS DTC 56. As a result, the MS DTC 56 becomes aware of the interconnect 64 and accepts automatic enlistment of transaction branches initiated by an MTS component. As mentioned above, the interconnect 64 appears to the MS DTC 56 and MTS component 54 as a local resource within the MTS environment—the resource that the interconnect 64 controls is the server application 40' (and the business logic held within it) on the remote system 60.

B. Processing of a Transaction Branch

Figure 7:
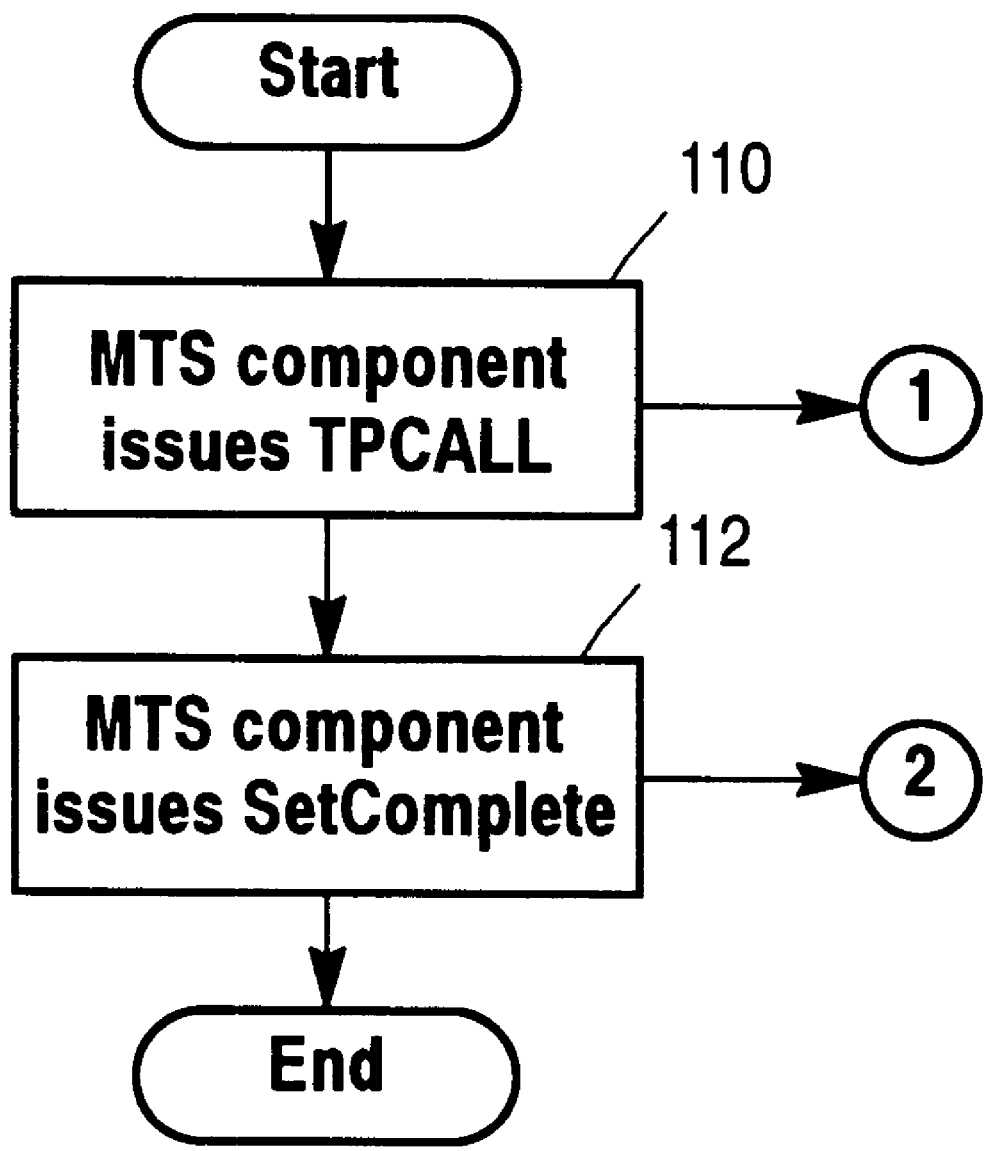
FIG. 7 is a flow diagram illustrating aspects of a global transaction.
Figure 8A:
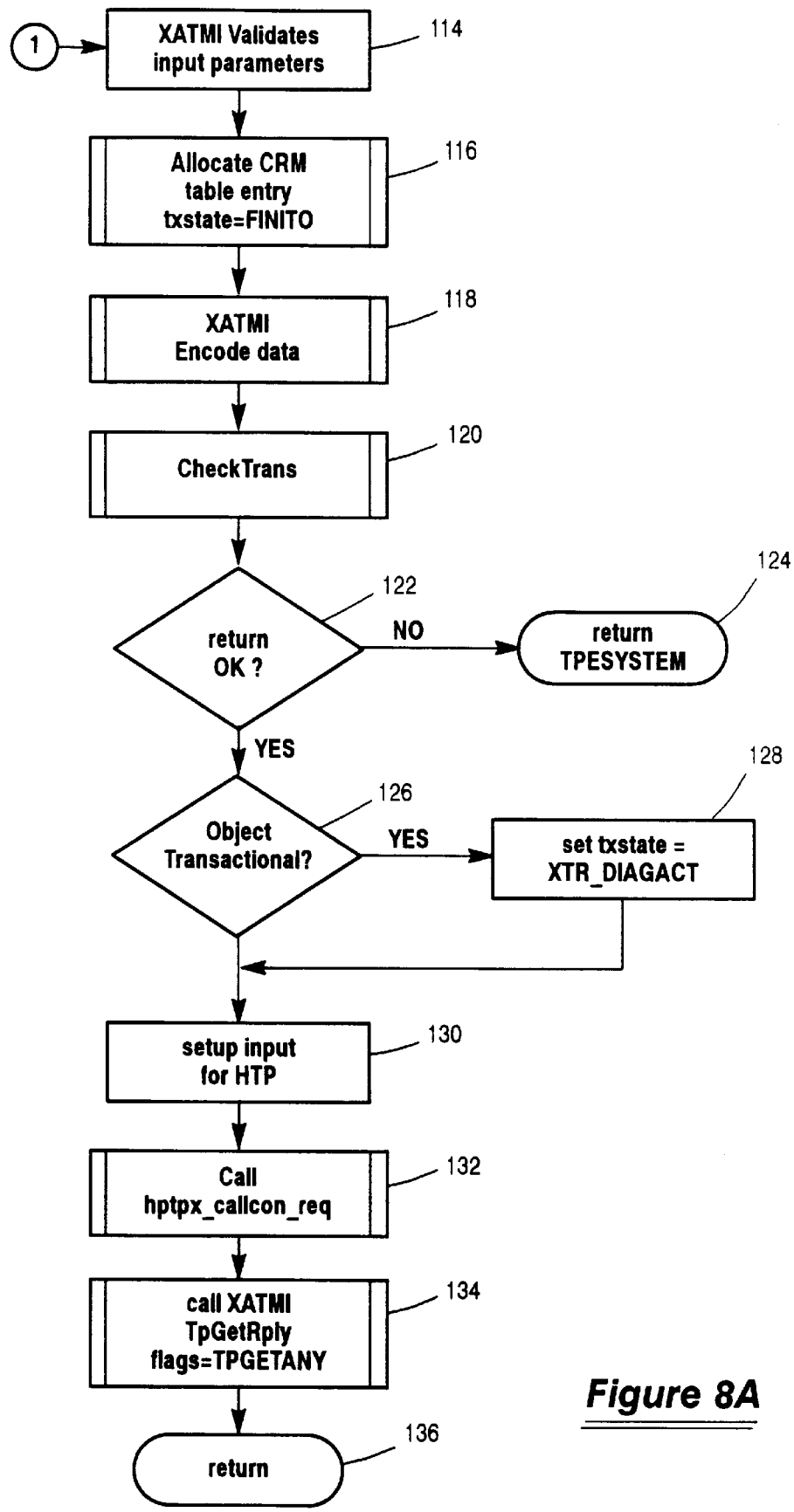
FIGS. 8A–C comprise a flow diagram that provides further details concerning the operation of the interconnect of FIG. 3, as well as illustrating aspects of a preferred embodiment of a method of the present invention.
Figure 8B:
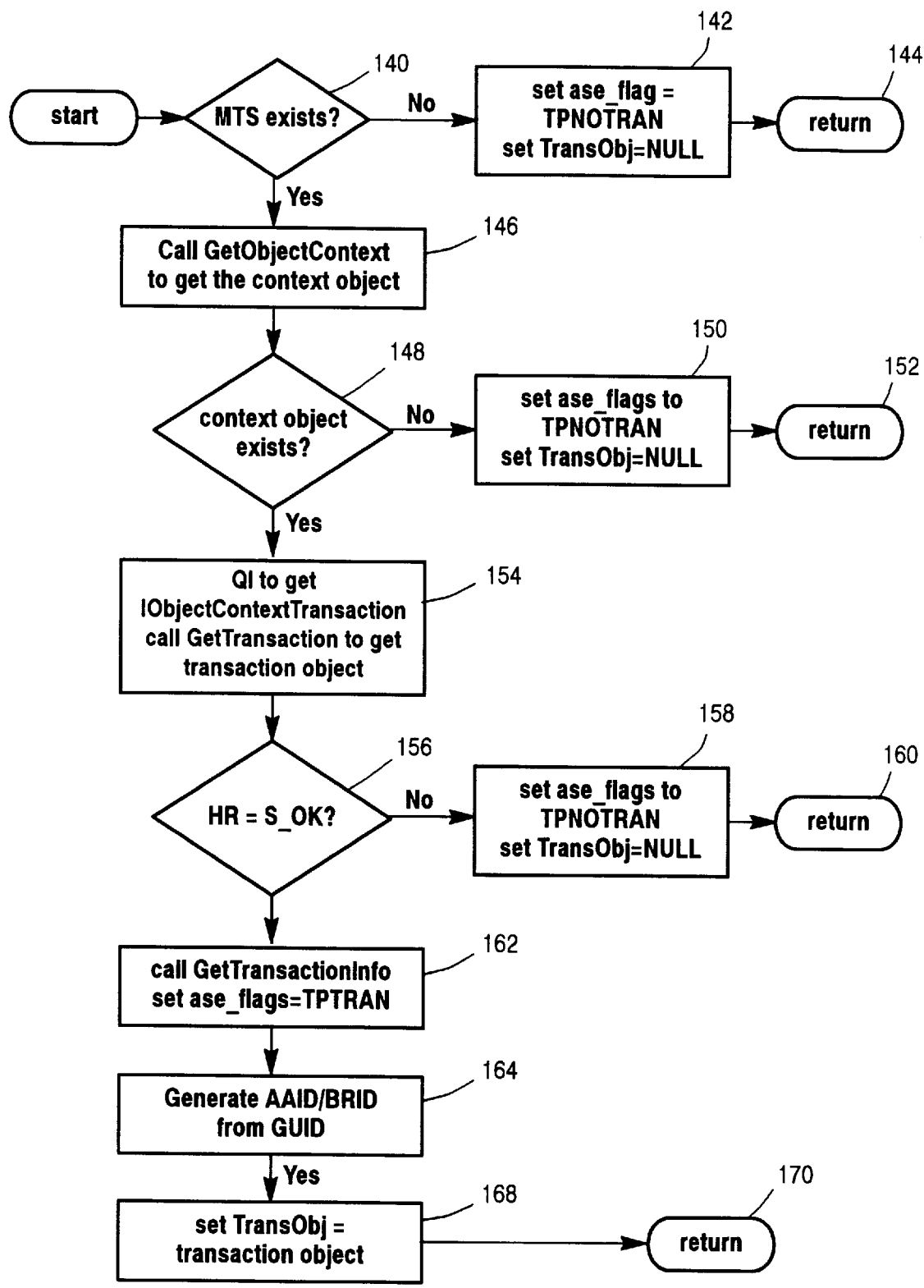
Figure 8C:
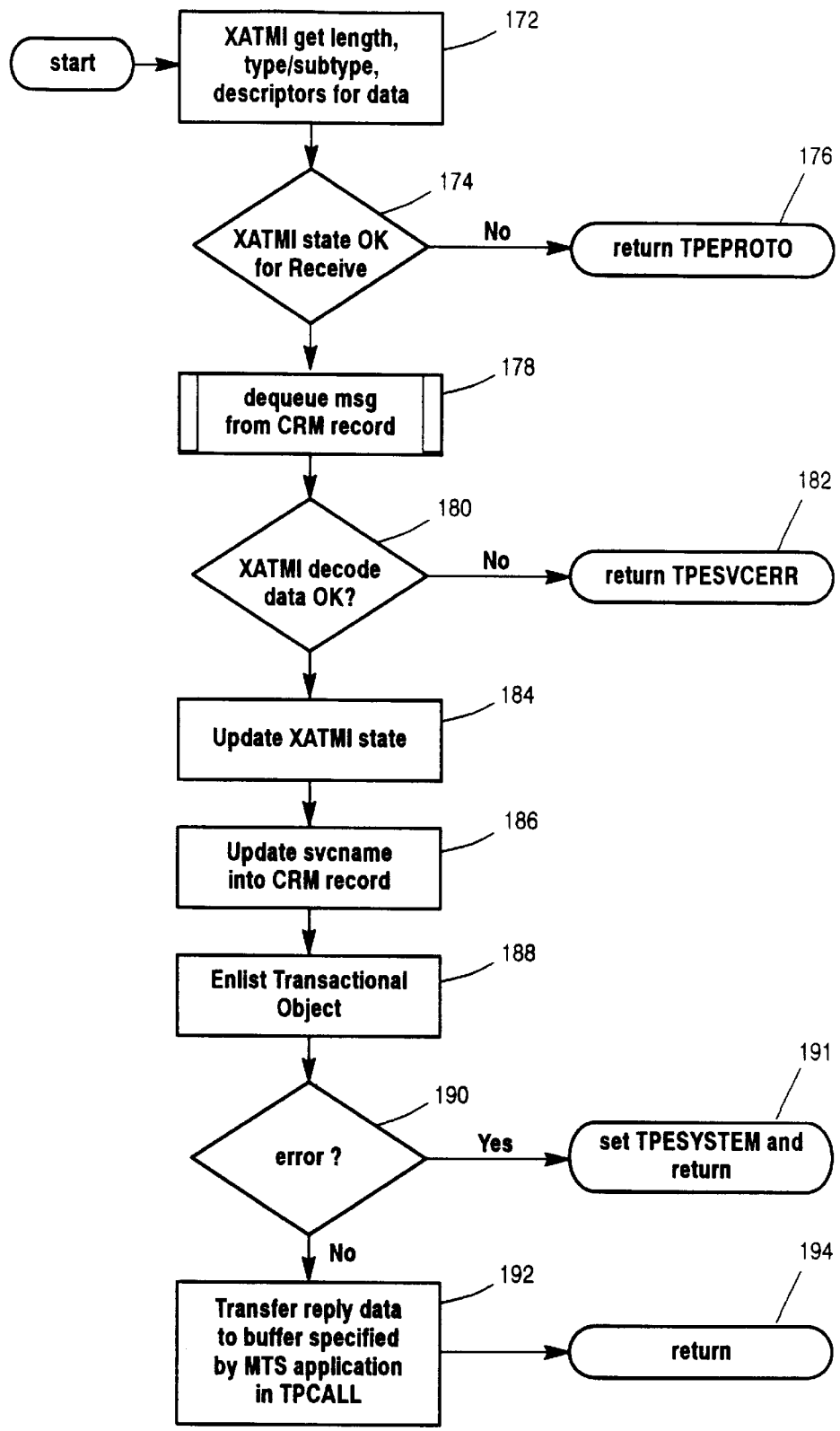

FIG. 7 illustrates the overall processing of a transaction branch initiated by an MTS component. As shown in step 110, a branch is initiated when the MTS component issues an XATMI service request to the resource manager 70 of the type that requires that a connection to the remote server 60 be established. These XATMI service requests include tpcall( ), tpacall( ), and tpconnect( ). Commitment processing will begin when the MTS component 54 invokes the SetComplete( ) method of its context object, indicating that the work that it was requested by the client application 52 to perform has been completed and is ready for commitment. FIGS. 8A–C illustrate the processing that is performed by the interconnect 64 of the present invention upon the receipt of an XATMI service request (i.e., tpcall, tpacall, tpconnect) from the MTS component. In this example, it is assumed that a tpcall( ) has been received from the MTS component. FIGS. 9A–I illustrate the commitment processing performed by the interconnect 64 after the MTS component 54 issues a SetComplete( ). Abort processing is also briefly described below.

1. Servicing an XATMI service request

Referring to FIG. 8A, when the XATMI service request, tpcall, is received by the XATMI interface logic 72 of the resource manager 70, processing begins at step 114 where the interface logic 72 validates the input parameters received with the service request. At step 116, the resource manager 70 allocates memory for a CRM record for the branch that this request represents. The state machine that controls the operation of the resource manager 70 enters the initial state (FINITO) for this branch. The txstate field of the CRM record is used to record the present state. Next, at step 118, the XATMI interface logic 72 encodes the XATMI data associated with the request in accordance with the XATMI Specification. At step 120, the resource manager 70 invokes a CheckTrans procedure to determine whether the MTS component has been configured as transactional, in which case the resource manager 70 will enlist this branch of the transaction with the MS DTC 56, as described hereinafter.

FIG. 8B illustrates further details concerning the CheckTrans procedure (step 120 of FIG. 8A). As shown in FIG. 8B, the CheckTrans procedure begins by determining whether the interconnect 64 is in fact operating within an MTS environment. If not, then the entity that issued the tpcall (i.e., the MTS component) is deemed not to be transactional, so the XATMI ase_flag is set to TPNOTRAN and the *TransObj field of the CRM record is set to NULL. Control then returns to step 122 of FIG. 8A.

If at step 140, it is determined that the interconnect 64 is operating within an MTS environment, then control passes to step 146. At step 146, the resource manager 70 calls the global GetObjectContext method to obtain a pointer to the context object of the MTS component 54. The result of this method invocation will indicate whether a context object exists for the MTS component 54. At step 148 the result is examined. If no context object exists, then control will pass to step 150 where the XATMI ase_flag is set to TPNOTRAN and the *TransObj field of the CRM record is set to NULL, as would be done in step 142. At step 152, control would then return to step 122 of FIG. 8A.

If at step 148 it is determined that a context object 79 does exists for the MTS component 54, then control passes to step 154. At step 154, using the pointer to the context object 79, the resource manager 70 invokes the standard COM method, QueryInterface( ) (abbreviated QI), to inquire whether the context object 79 has an IObjectContextTransaction interface and, if so, to obtain a pointer to that interface. By way of additional background, interfaces are a standard mechanism for interaction among COM objects. COM Objects use a mechanism known as interface navigation to determine what methods of another object it can invoke. With COM, this process begins by obtaining a pointer to a target object's IUnknown interface. The COM specification requires all COM objects to implement the IUnknown interface. One of the methods of the IUnknown interface is QueryInterface( ). A client object or application invokes the QueryInterface( ) method of a target object to determine whether the target object implements a particular interface that the client object knows how to use. If the target object does implement the requested interface, it will return a pointer to that interface to the client object.

Assuming that the QueryInterface( ) method provides a valid pointer to the IObjectContextTransaction interface of the context object 79, the resource manager 70 invokes the GetTransaction method of that interface to obtain a pointer to the Transaction object 78 that represents the transaction for which the MTS component is performing the work. At step 156, the result of this method is examined to determine whether a Transaction object 78 was located. If not, the resource manager 70 treats the MTS component 54 as non-transactional and, as shown in step 158, sets the XATMI ase_flag to TPNOTRAN and sets the *TransObj field of the CRM record to NULL, as would be done in steps 142 and 150. At step 160, control would then return to step 122 of FIG. 8A.

If, however, a valid status is returned in step 156, control passes to step 162. At step 162, the resource manager invokes the GetTransactionInfo method of the ITransaction interface of the Transaction object 78 to obtain information about the transaction. Specifically, this information includes the GUID assigned to the transaction by MTS. Additionally, the resource manager 70 sets the XATMI ase_flag to TPTRAN to indicate that this is a transactional request.

Next, at step 164, assuming that the current XATMI service request represents the first branch of the transaction, the resource manager 70 generates an AAID/BRID combination for the branch from the GUID obtained in step 162, in the manner described above. The AAID/BRID is then used to identify the transaction, and the current branch thereof, within the OSI TP protocol machine 68. If this were not the first branch of the transaction, then the resource manager 70 would have searched its internal tables to find a previously generated AAID for this transaction. The resource manager 70 would still, however, generate a unique branch suffix (BRID) for this branch.

At step 168, the pointer to the Transaction object 78 is stored in the *TransObj field of the CRM record. Control then passes back to step 122 of FIG. 8A.

Referring again to FIG. 8A, at step 122, the resource manager 70 verifies that the CheckTrans procedure executed properly. If an error occurred, then control passes to step 124 where a TPESYSTEM error is reported. If no errors occurred, then control passes to step 126.

From step 126, control will pass to step 128 if the MTS component 54 was determined during the CheckTrans procedure to be transactional. At step 128, the state of the current branch is changed to XTR_DIAGACT by storing its corresponding value in the txstate field of the CRM record for the branch. If the MTS component was not determined to be transactional, then control will pass directly to step 130.

At step 130, the resource manager 70 sets up the appropriate call to the OSI TP service interface logic in order to have the OSI TP protocol machine 68 process the OSI TP service requests that correspond to the received XATMI service request (i.e., tpcall in this example). In the present embodiment, in which the OSI TP service interface logic 88 implements the HPTPX interface described in co-pending application Ser. No. 09/020,213, the corresponding service request of the HPTPX interface is the hptpx_callcon_req service request. Thus, at step 130, the resource manager 70 constructs this service request with the appropriate parameters. Note again that, as in the state table of FIGS. 6A–6D, the term "HTP" refers to the particular implementation of the OSI TP protocol machine employed in the preferred embodiment of the present invention, i.e., the modified OSI TP protocol machine described in co-pending patent application Ser. No. 09/020,213, as well as to the corresponding HPTPX interface that implements the OSI TP service interface logic 88 therefor.

At step 132, the hptpx_callcon_req is issued to the OSI TP protocol machine 68 via the HPTPX interface 88. The OSI TP protocol machine 68 processes the request and transmits it to the remote server 60 via the connection established for this branch.

Next, at step 134, the resource manager 70 automatically, on behalf of the MTS component 54, issues the XATMI service request, tpgetrply( ), in order to receive any reply transmitted from the remote server 60. The interconnect 64 then waits for the reply to come in from the remote server 60 on an input thread 104. The reply will then propagate back up through the OSI TP protocol machine 68 to the resource manager 70. FIG. 8C shows in greater detail the steps that occur after the tpgetrply is issued.

Referring to FIG. 8C, at step 172, the XATMI interface logic 72 of the resource manager 70 gets information concerning the length, type/subtype, and descriptors of the data expected to be received. At step 174, the XATMI interface logic 72 makes sure that it is in the proper state to receive the data, as required by the XATMI Specification. If the XATMI interface logic 72 is not in the proper state, then an error is reported at step 176. If the state of the XATMI interface logic 72 is correct, then control passes to step 178.

At step 178, the XATMI interface logic waits for the reply data to be received into the msg_q buffer specified in the CRM record for this branch. Once the message is received, the message is dequeued from the msg_q buffer. The XATMI interface logic 72 then decodes the received XATMI data at step 180 and, if no errors occur, updates its state, as specified in the XATMI Specification. If an error occurs, the error is reported at step 182. Assuming that no errors occurred, and that the XATMI state has been updated at step 184, control passes to step 186 where the resource manager 70 updates the svcname field in the CRM record. Control then passes to step 188.

At step 188, the resource manager 70 enlists the branch with the MS DTC 56 in order to receive commitment directives for the branch from the MS DTC 56. Specifically, using the export object associated with the MTS component 54, the resource manager 70 obtains information about the transaction from the Transaction object 78. This information is passed in the form of a transaction cookie. Once this information is received, the resource manager 70 creates a CTransactionResourceAsync object 76 for the branch, calls the Init method of the CTransactionResourceAsync object 76 (which causes the crm_id of the branch to be stored in the object), invokes the Enlist method of the IResourceManager object 108, and passes to the MS DTC 56 both a pointer to the ITransactionResourceAsync interface of the CTransactionResourceAsync object 76 and a pointer to the Transaction object 78. As part of its enlistment duties, the MS DTC 56 creates an Enlistment object 80 for the branch and passes a pointer to the ITransactionEnlistmentAsync interface of that object back to the resource manager 70. Thus, as used in this context, the term "enlist" refers to the means by which the resource manager 70 notifies the relevant transaction manager, in this case the MS DTC 56, that this branch is part of the global transaction and that the resource manager 56 needs to be informed of subsequent activity relating to the transaction (e.g., prepare, commit, abort, etc.). The resource manager 70 stores the pointers to the objects involved in this process in the *EnlistObj, *ExportObj, and *TransCookie fields of the CRM record. If an error occurs, it is reported at step 191. Otherwise control passes to step 192.

At step 192, the reply data that was dequeued from the msg_q buffer in step 178 is passed to the buffer specified by the MTS component 54 when it issued its tpcall( ). At step 194, control returns to step 136 of FIG. 8A which completes this part of the processing of the branch. Control then returns to step 110 of FIG. 7 where the interconnect 64 waits for the MTS component 54 to issue a SetComplete( ).

2. Commitment Processing

Referring briefly to FIG. 7, commitment processing begins upon the issuance of a SetComplete request by the MTS component 54, as shown in step 112. Specifically, the MTS component 54 invokes the SetComplete( ) method of the IObjectContext interface of its context object. This informs the MS DTC 56 that the MTS component 54 has completed all of the work that it was requested by the client application 52 to perform.

FIGS. 9A–9I provide further details concerning the operation of the interconnect 64 of the present invention, after the issuance of a SetComplete( ), as well as providing further details of a preferred embodiment of the methods of the present invention. In particular, FIGS. 9A–9I illustrate the processing that is performed for the transaction branch initiated in the steps of FIGS. 8A–8C described above.

Figure 9A:
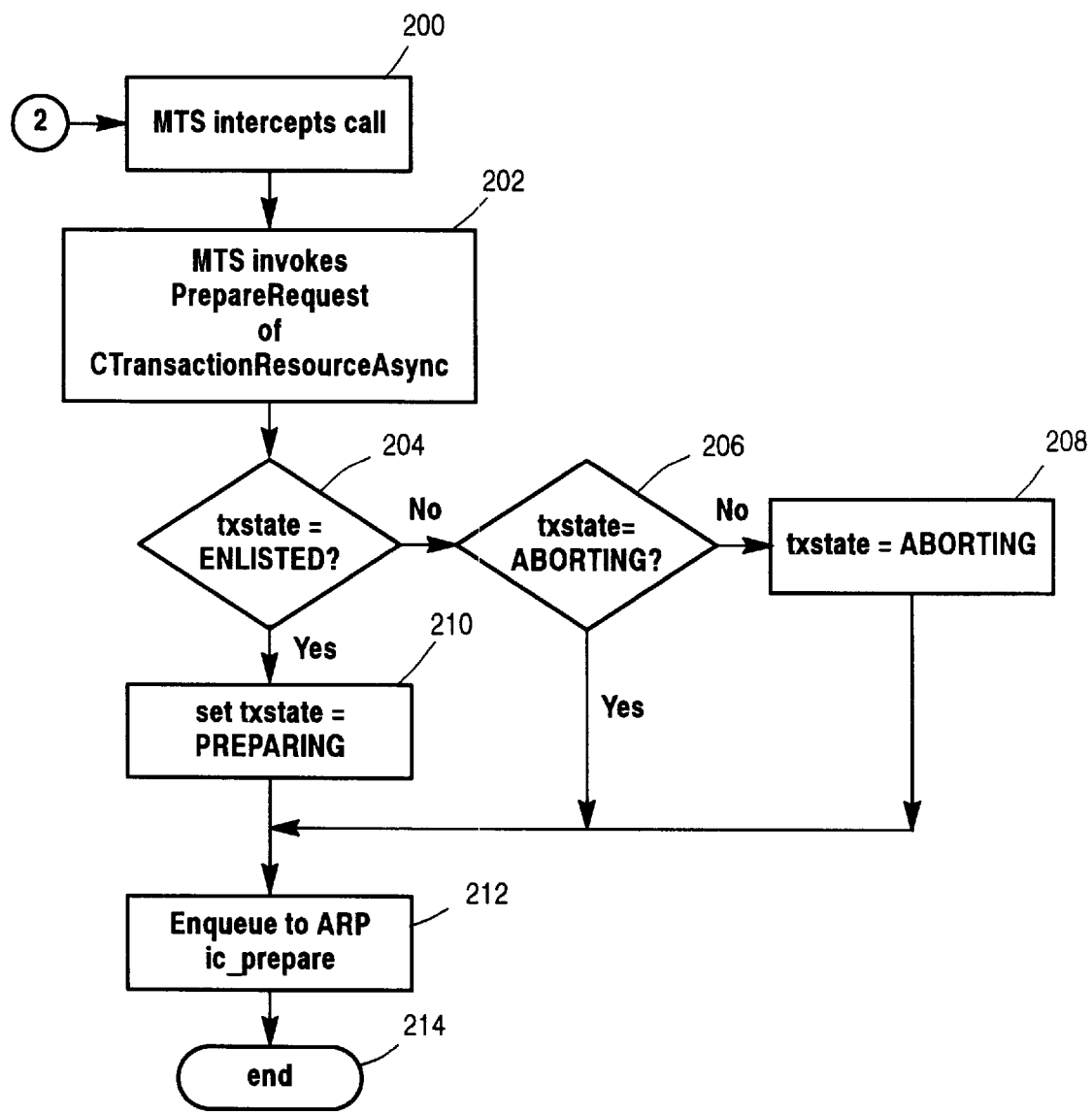
FIGS. 9A–I comprise a flow diagram that provides still further details concerning the operation of the interconnect of FIG. 3, as well as illustrating further aspects of the method of the present invention, in accordance with the preferred embodiment.

Referring to FIG. 9A, at step 200, the MS DTC 56 intercepts the SetComplete( ) issued by the MTS component 54. At step 202, the MS DTC 56 issues a prepare directive by invoking the PrepareRequest method of the CTransactionResourceAsync object 76 of this branch. As part of the program code of the PrepareRequest method, at step 204, the resource manager 70 checks the txstate field of the CRM record for the branch to determine whether the branch has been enlisted with the MS DTC. If so, control passes to step 210 where the state is changed to PREPARING. At step 212, an ic_prepare event is enqueued to the ARP 96. The ic_prepare event is one of the events defined in the state table that control the operation of the resource manager 70 (see FIG. 6C). Details of the processing that occurs in connection with the ic_prepare event are provided hereinafter. At step 214, the prepare phase of commitment ends.

If at step 204, the current branch is determined not to be in the ENLISTED state, then it is most likely that the branch is in the ABORTING state, indicating that the OSI TP protocol machine 68 is in the process of aborting this transaction. If the branch is neither in the ENLISTED state nor the ABORTING state, then at step 208, the branch is forced into the ABORTING state as some error has likely occurred. Control then passes to step 212, where the ic_prepare event is still enqueued to the ARP 96, however, the state of the branch will in this case not have been changed to PREPARING.

Figure 9B:
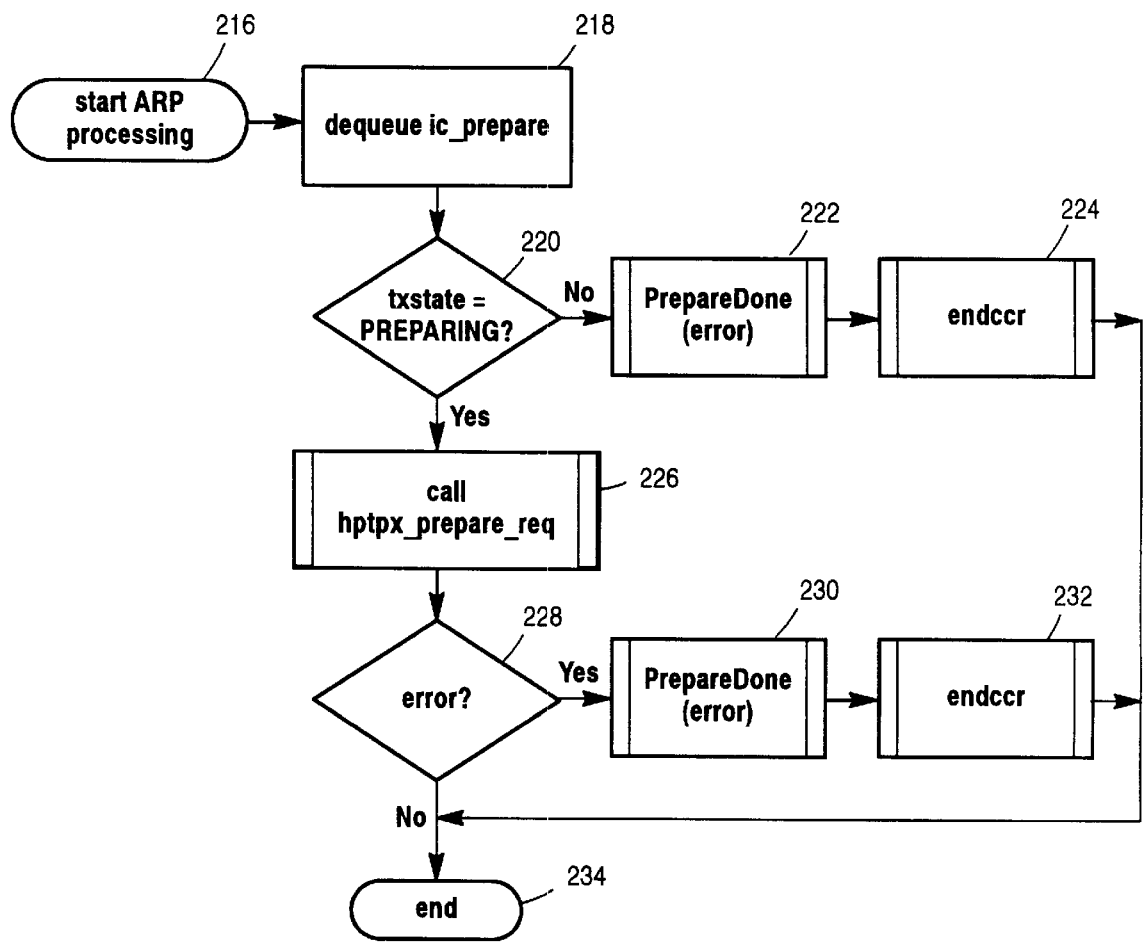

FIG. 9B illustrates the steps performed in connection with the ic_prepare event, as defined in the state table of FIGS. 6A–6D. These steps are performed by the connection manager 66 of the interconnect 64, which runs as a separate process from the resource manager 70. That is why it is necessary to employ the ARP 96. At step 218, the ARP 96 dequeues the ic_prepare event, and execution of the steps (i.e., actions) associated with that event begins at step 220.

At step 220, the connection manager 66 determines from the txstate field of the CRM record for this branch whether the branch is in the PREPARING state. If not, then at step 222, a PrepareDone procedure is executed, followed by an endccr procedure, both of which are described hereinafter in greater detail.

If at step 220, the branch is determined to in fact be in the PREPARING state, then control passes to step 226 where the hptpx_prepare_req request of the OSI TP service interface 88 is issued to the OSI TP protocol machine 68. This step represents the translation of the MS DTC prepare directive into the corresponding service request of the OSI TP protocol machine 68. Recall from above that in the preferred embodiment, the OSI TP service interface 88 and OSI TP protocol machine 68 are implemented using the HPTPX interface and modified OSI TP protocol machine, respectively, described in co-pending application Ser. No. 09/020,213. The hptpx_prepare_req request is one of the service primitives of the HPTPX interface described therein.

If no errors occur, then the prepare request has been properly issued by the OSI TP protocol machine 68 to the remote server 60. The ic_prepare event is thus complete, as indicated at step 234. Now, the OSI TP protocol machine 68 awaits a ready indication from the remote server 60. If, however, an error is detected at step 228, then control passes to step 230, where the PrepareDone procedure is executed, followed by the endccr procedure (step 232), both of which are described hereinafter.

Figure 9C:
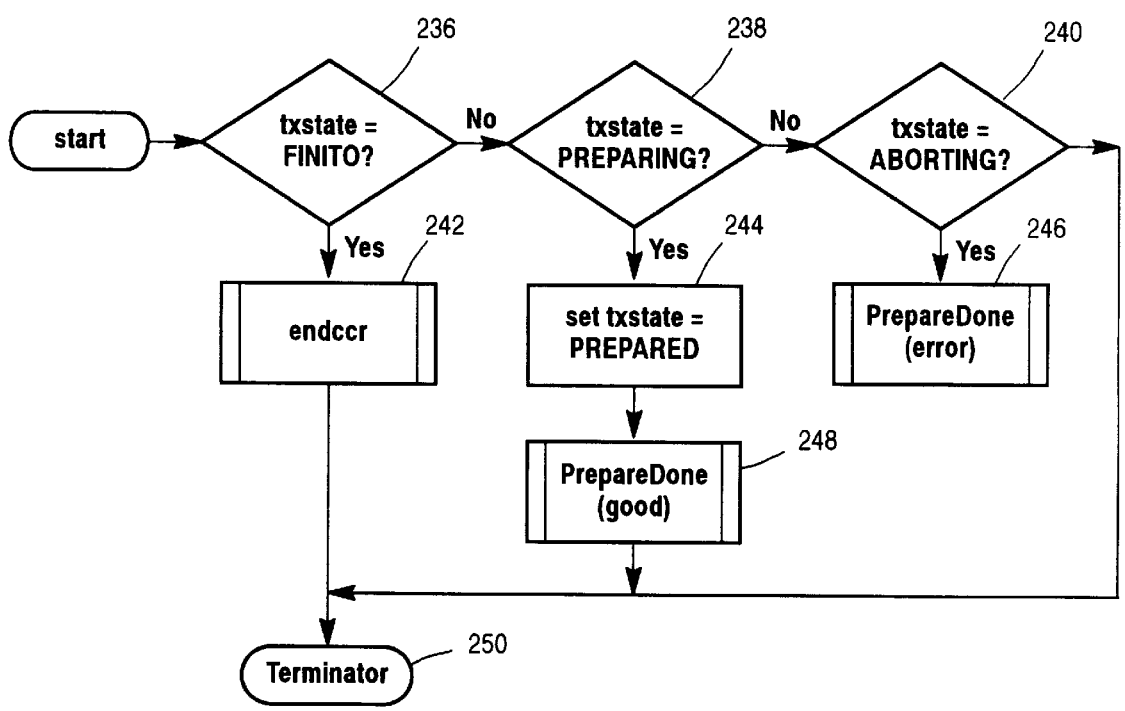

FIG. 9C illustrates the processing that the connection manager 66 performs after the OSI TP protocol machine 68 receives an hptpx_ready indication from the remote server 60, indicating that the resource on the remote server 60 is prepared to commit its work. If everything has been working properly, the branch should be in the PREPARING state, and control will therefore pass from step 238 to step 244. At step 244, the txstate field of the CRM record for the branch is set to PREPARED. Then, at step 248, the PrepareDone procedure is called with a parameter that indicates that the prepare has executed successfully thus far (i.e., status is "good").

If the branch is not in the PREPARING state, then some error has occurred. If the branch is in the FINITO state, then control passes from step 236 to step 242 where the endccr procedure is called. If the branch is in the ABORTING state, then the PrepareDone procedure is called with a parameter that indicates that an error has occurred. The prepare process concludes at step 250.

Figure 9D:
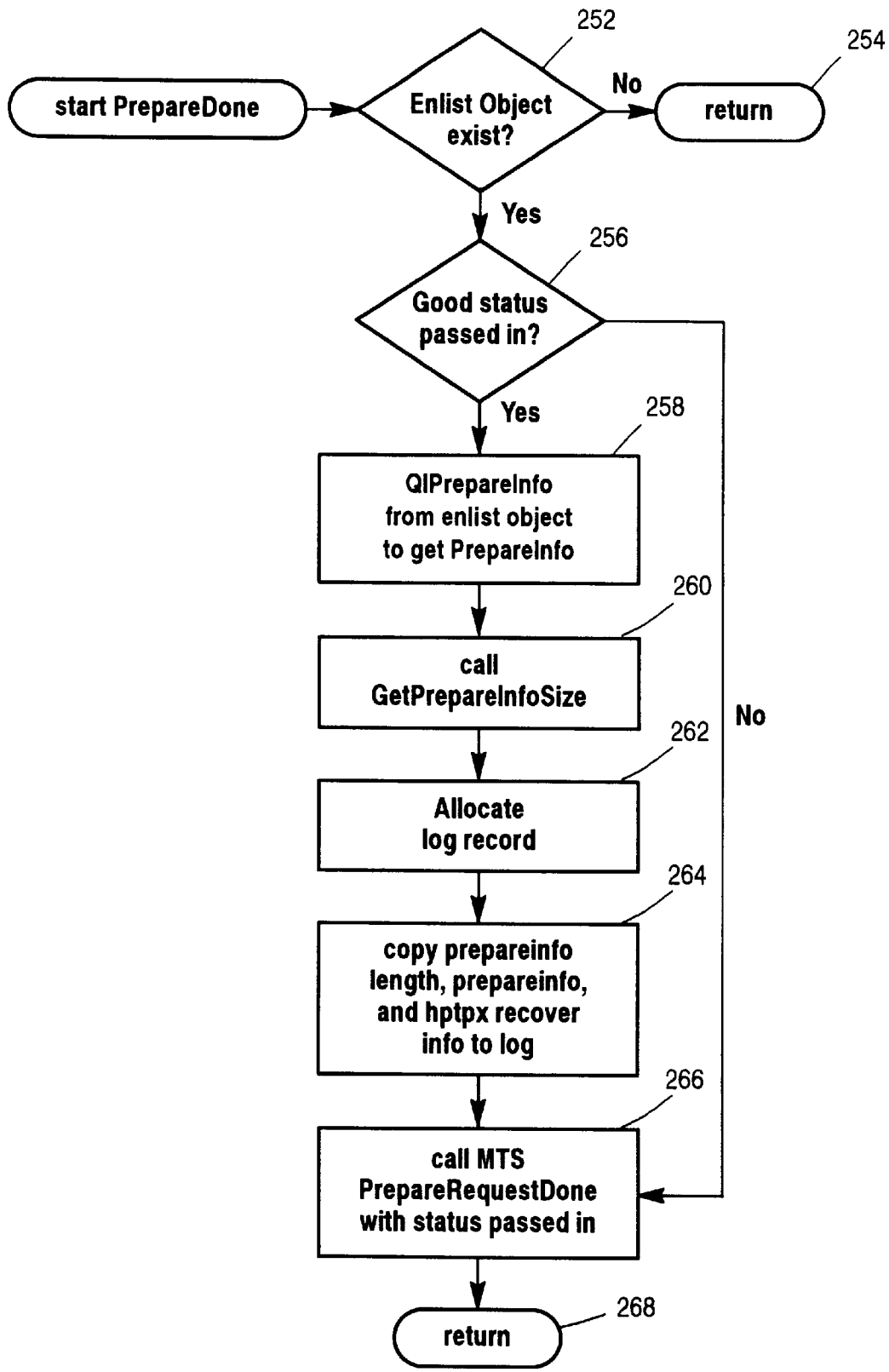

FIG. 9D illustrates the steps of the PrepareDone procedure. At step 252, a determination is made as to whether an Enlistment object 80 exists for this branch. If an Enlistment object 80 does exist, a pointer to the object will be stored in the *EnlistObj field of the CRM record. If no Enlistment object exists, then there is no need to continue commitment processing, and control returns to the calling thread at step 254.

If at step 252 it is determined that an Enlistment object 80 does exist, then control passes to step 256 where the status parameter passed into the PrepareDone procedure is evaluated. If the status is "good", then control passes to step 256. If the status is other than "good", then control passes to step 266 where the PrepareRequestDone method of the ITransactionEnlistmentAsync interface of the Enlistment object 80 is invoked. The status is provided as a parameter to this method to inform the MS DTC that the prepare directive has not completed successfully. The PrepareDone procedure then returns at step 268.

If the status is "good", then at step 258, the QueryInterface( ) method is invoked to obtain a reference to the IPrepareInfo interface of the Enlistment object 80. Next, at step 260, the GetPrepareInfoSize method of the IPrepareInfo interface is invoked to obtain an indication of the size of the PrepareInfo structure that the MS DTC 56 has created for this branch. At step 262, a procedure is called to allocate secure storage for a log record for this branch. Next, at step 264, the GetPrepareInfo method of the Enlistment object 80 is invoked to obtain the PrepareInfo structure for this branch from the MS DTC 56. Once obtained, the PrepareInfo structure, an indication of its size, and the recovery-related information needed for OSI TP recovery, are all stored together in the allocated log record for this branch. The crm_id that points to the CRM record for the branch is also stored in the log record. This log record thus contains, in one record, all information needed for recovery in both the MTS environment and the OSI TP protocol machine 68. A pointer to the log record is stored in the *log_rec field of the CRM record. At step 266, the PrepareRequestDone method of the Enlistment object 80 is invoked to inform the MS DTC 56 that its prepare directive has completed successfully. The status ("good") is passed with the method. The process then returns at step 268.

Figure 9E:
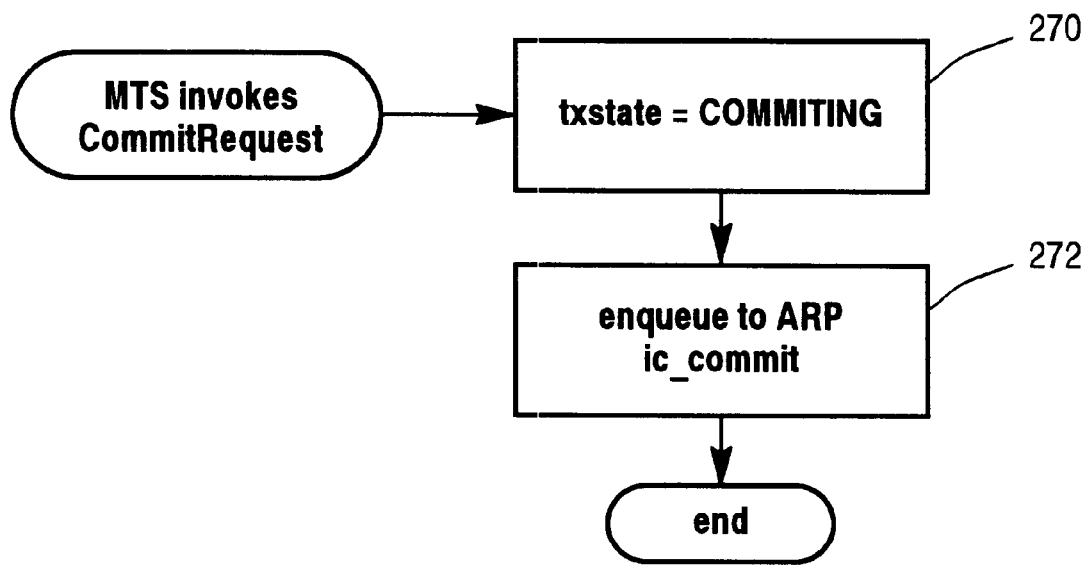
Figure 9F:
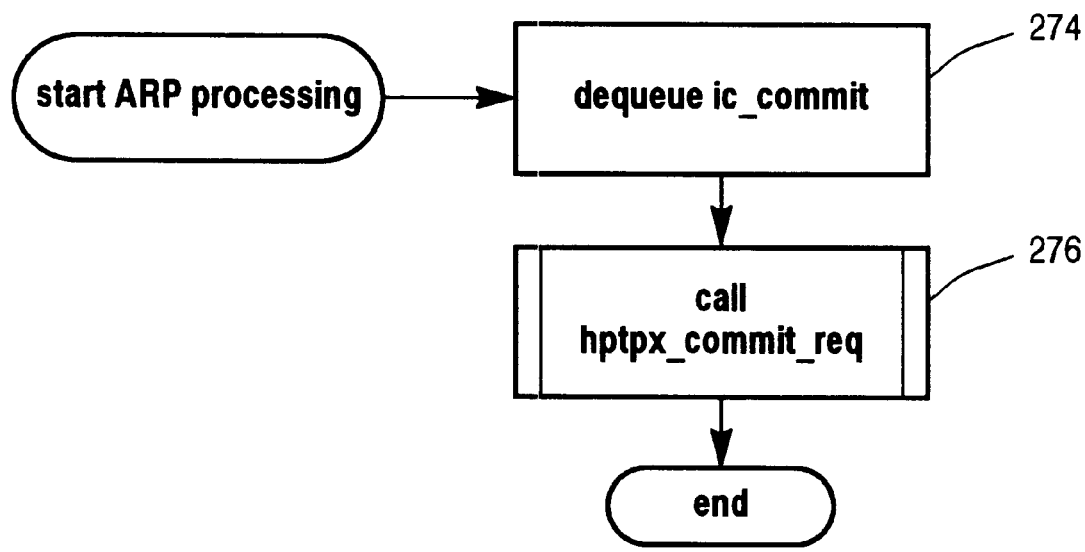

FIGS. 9E and 9F illustrate the processing that occurs when the interconnect 64 receives a commit directive from the MS DTC 56, i.e., the MS DTC 56 invokes the CommitRequest method of the CTransactionResourceAsync object 76. Referring to FIG. 9E, at step 270, the resource manager 70 changes the state of the branch to COMMITING. The txstate field of the CRM record is updated to reflect this change. At step 272, the ic_commit event, which is defined in the state table of FIGS. 6A–6D, is enqueued to the ARP 96. Referring now to FIG. 9F, at step 274, the ic_commit event is dequeued from the ARP 96. Step 276 comprises the action to be performed for the ic_commit event. As shown, an hptpx_commit_req is issued to the OSI TP service interface logic 88 (which in this embodiment comprises the aforementioned HPTPX interface). This step represents the translation of the MS DTC commit directive (CommitRequest) into the corresponding OSI TP service request. Specifically, the hptpx_commit_req service request is mapped by the HPTPX interface logic 88 to a corresponding service primitive of the OSI TP Protocol Specification. The OSI TP protocol machine 68 then communicates this service request to the remote system 60 in accordance with the OSI TP Protocol Specification. At this point, the OSI TP protocol machine 68 awaits an indication (hptpx_commit_complete) from the remote server 60 that the OSI TP commit request has completed successfully.

Figure 9G:
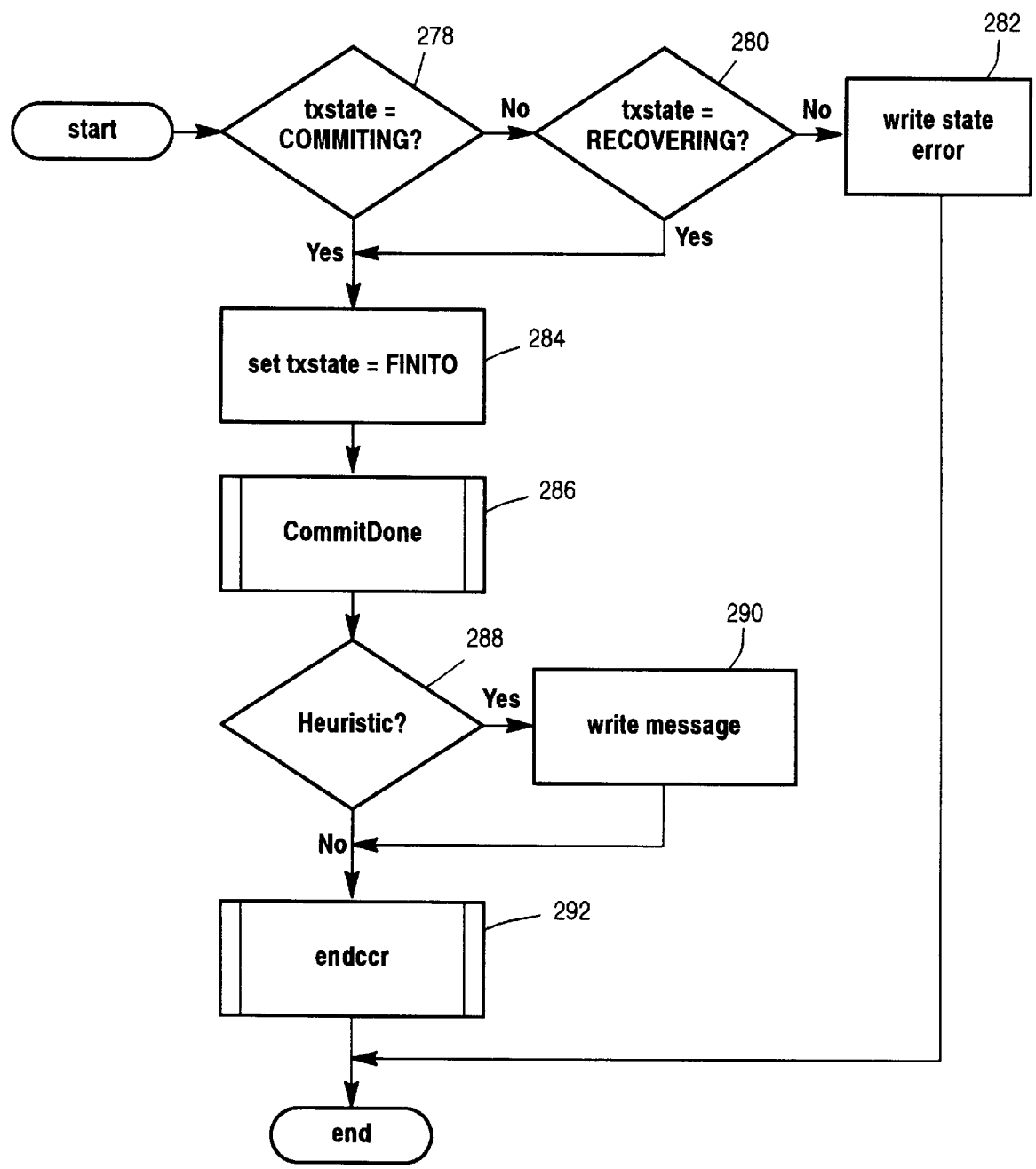

FIG. 9G shows the steps that are performed once the OSI TP protocol machine 68 receives an hptpx_commit_complete indication from the remote server 60. At steps 278 and 280, the interconnect 64 determines whether the branch is in the COMMITING state or the RECOVERING state. Both states are valid, because the same subsequent steps are performed whether normal commitment is occurring or whether a commit request has been received after the interconnect 64 begins its recovery processes (described below). If the branch is not in either of these states, then control passes to step 282 where an error is recorded and the commit process is terminated.

Assuming that the branch is in either the COMMITING state or the RECOVERING state, control will pass to step 284. Since commitment represents the completion of processing for a branch, the state of the branch is set to FINITO. Next, at step 286, a CommitDone procedure is called.

Figure 9H:
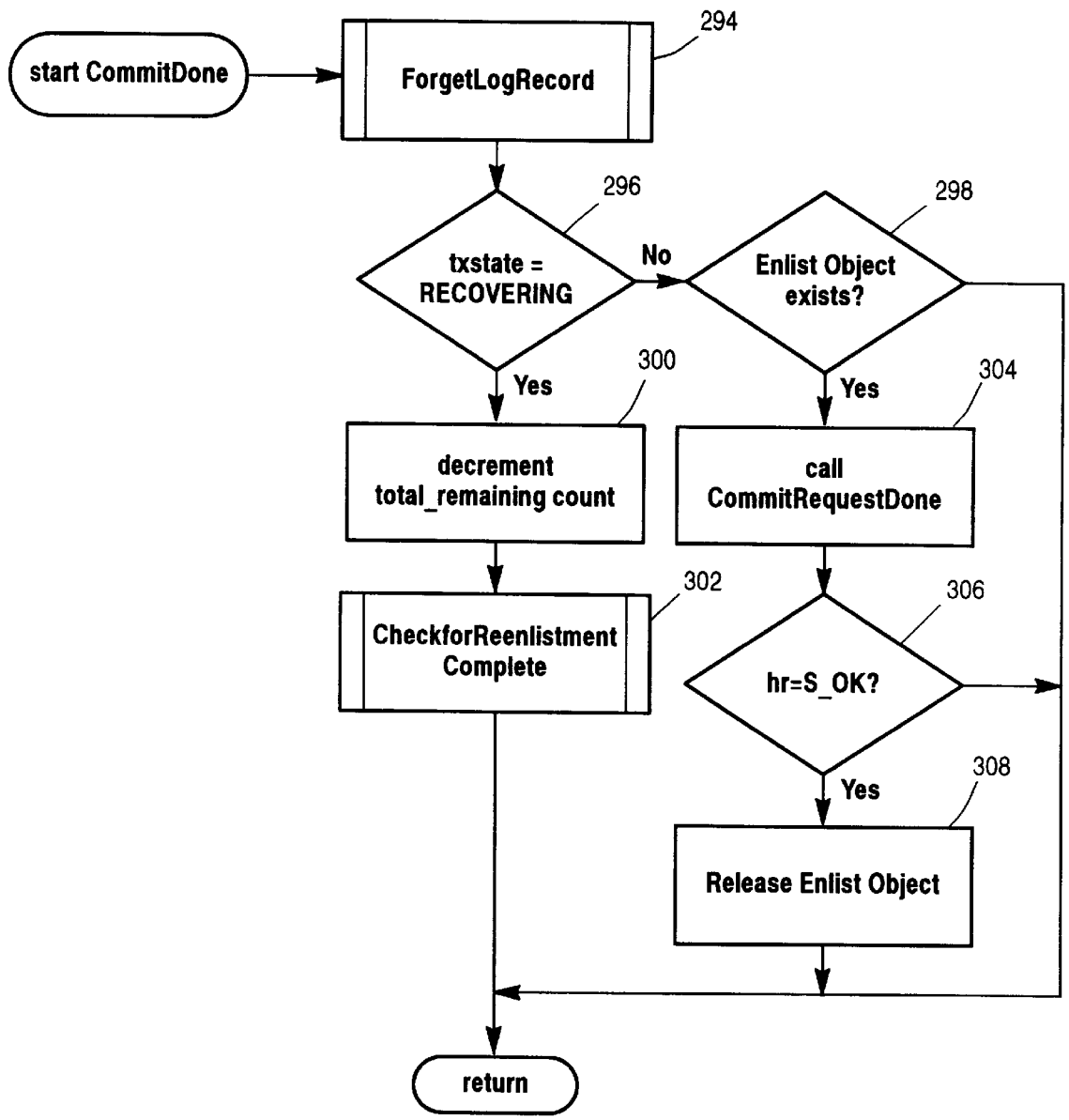
Figure 9L:
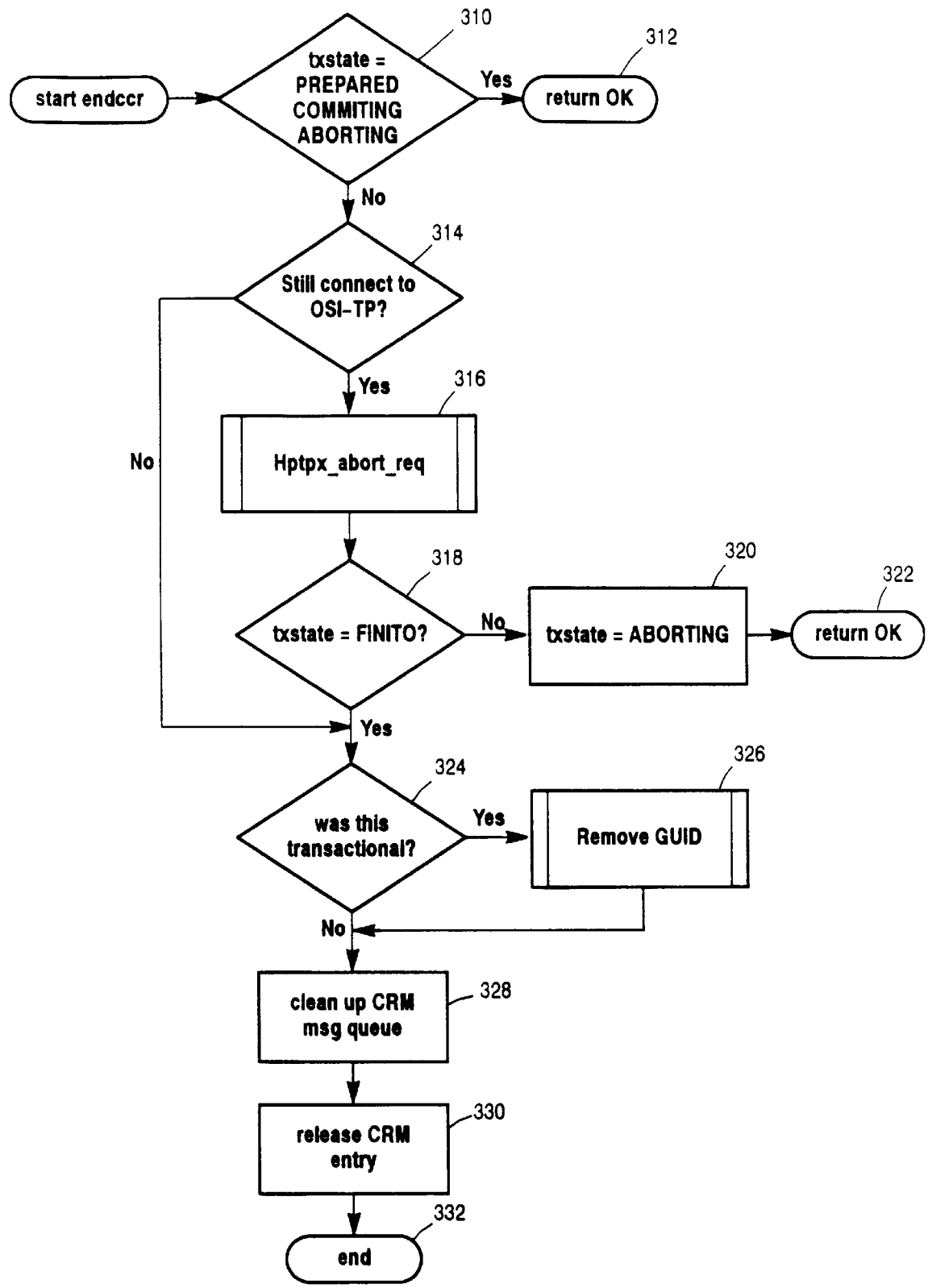

FIG. 9H shows the steps performed by the CommitDone procedure. At step 294, a procedure is called that deallocates the secure storage for the log record. The log record is no longer needed, since the commitment has completed successfully at the remote server 60. At step 296, the state of the branch is examined. If the branch is not in the RECOVERING state, then control passes to step 298. At step 298, the procedure checks to make sure the Enlistment object 80 for this branch exists. If not, the procedure ends. If the Enlistment object 80 does exist, then control passes to step 304.

At step 304, the CommitRequestDone method of the Enlistment object 80 is invoked to inform the MS DTC that this branch of the transaction has committed successfully. If the method executes properly (step 306), then the Enlistment object 80 is released at step 308, as it is no longer needed. If an error occurs, then the Enlistment object 80 is not released and the procedure returns.

If at step 296, it is determined that the branch is in the RECOVERING state, then control passes to step 300. In this case, the interconnect 64 is in recovery from a failure and must complete commitment of any branches that were not completed before the failure. The total_remaining count reflects the number of in-doubt branches. Since recovery of this branch is being completed in this part of the procedure, the total_remaining count is decremented in step 300 to reflect this. At step 302, a CheckforReenlistmentComplete procedure is called. This procedure examines the total_ remaining count, and when it has reached zero (indicating that all in-doubt transactions have now completed their commitment) then the ReenlistmentComplete method of the Resource Manager object 108 is invoked to indicate to the MS DTC 56 that reenlistment and recovery have been completed. The CommitDone procedure then returns.

Referring again to FIG. 9G, when the CommitDone procedure returns, control passes to step 288. At step 288, the interconnect determines whether a Heuristic has been received in connection with commitment processing. The Heuristic is a status indicator specified in the OSI TP Protocol Specification. It reports any abnormalities that the remote server 60 may have detected during commitment. If no Heuristic was received, then control passes to step 292 where an endccr procedure is called. If a Heuristic is received, it is written to a file in step 290 before the endccr procedure is called.

FIG. 9I illustrates the steps that are performed by the endccr procedure. This procedure is used to release resources that are no longer needed once a branch has committed or aborted. At step 310, the procedure checks the state of the branch. If the state is any of the PREPARED, COMMITING, or ABORTING states, then the resources associated with the branch are awaiting an indication from the remote server 60. Accordingly, if the endccr procedure is reached when a branch is still in one of these state, the procedure will end at step 312.

If the branch is not in any of these states, then control passes to step 314 where it is determined whether the OSI TP protocol machine 68 still holds a connection to the remote server for this branch. If so, control passes to step 316 where an hptpx_abort_req is issued to terminate the connection. Next, at step 318, if the state of the branch is not FINITO, then the branch is forced into the ABORTING state at step 320 and the procedure returns at step 322. If the branch is in the FINITO state, then control passes to step 324. This step is also reached from step 314, if it is determined therein that the OSI TP protocol machine 68 has properly terminated the connection to the remote server 60 for this branch.

If at step 324, it is determined that this branch was part of a transaction, then at step 326, the GUID/AAID/BRID mapping for this branch is released. At step 328, the msg_q buffer used to hold reply data for the branch is deallocated. At step 330, the CRM record is released. The procedure ends at step 332. At this point, all processing for this branch is done.

3. Abort Processing

Abort directives issued by the MS DTC 56 are processed and coordinated by the interconnect 64, under control of the state table of FIGS. 6A–6D, in a manner similar to the processing and coordination of commit directives as described above. The MS DTC 56 uses the AbortRequest method of the CTransactionResourceAsync object 76 to issue an abort request directive to the resource manager 70. This triggers the abort request (MTS) event in the state machine (see FIG. 6). As part of the processing of this event, and in accordance with the present invention, this abort request is translated by the resource manager 70 into an hptpx_rollback_req service request of the OSI TP service interface 88, which, in turn, represents the corresponding OSI TP service request (rollback_req) for aborting a transaction branch. When the OSI TP protocol machine 68 receives an indication from the remote server 60 that the rollback_req has been completed successfully, the resource manger 70 informs the MS DTC 56 by invoking the AbortRequestDone method of the Enlistment object. Further details concerning abort processing are provided in the state table.

C. Recovery

As mentioned above, the interconnect 64 of the present invention has the ability to recover from both failure of itself and/or the failure of the MS DTC 56. Failure of the MS DTC 56 is reported to the interconnect via the TMDown method of the CResourceManagerSink object 82 and CTransactionResourceAsync object 76 of each branch. The following are the steps performed for reenlisting with the MS DTC 56 after the interconnect receives a TMDown notification from the MS DTC 56:

1. Call the MTS API, DTCGetTransactionManager, to obtain a pointer to the MS DTC Proxy Core object 106.
2. Create an instance of the CResourceManagerSink object 82 to provide the IResourceManagerSink interface so that the MS DTC 56 can notify the interconnect 64 of subsequent TMDowns. If this succeeds continue, otherwise set a timer event to try re-enlistment later.
2. Create a Resource Manager object 108 using the IResourceManagerFactory interface of the MS DTC Proxy Core object 106.
3. Set rch_status to in recovery. Rch_status is an OSI TP variable that controls whether incoming channel association requests sent from the remote server 60 will be accepted. When set to in_recovery, the remote server 60 is informed to retry the channel association request at a later time.
4. Initialize internal storage for log records and set total_remaining logs count to the total number that exist in secure storage.
5. Read the log records in the log file to determine which transaction branches are in doubt.
6. For each log record:
   a) Find CRM record that goes with the log, and if CRM record exists, change the state to RECOVERING.
   b) call IResourceManager::Reenlist of the Resource Manager object 108 for this in-doubt transaction to query the MS DTC 56 for the status of this branch. Pass the original PrepareInfo structure saved in secure storage to the MS DTC 56 along with a time-out value.
   c) If the MS DTC 56 returns a time-out:
      save needed information for reenlist
      enqueue timer event (every 2 min) to retry enlistment for this branch
   d) If the MS DTC 56 returns an XACTSTAT_COMMITED then
      issue commit request to the OSI TP protocol machine 68 for this branch
      increment complete_expected count
   e) If the MS DTC 56 returns an XACTSTAT_ABORTED
      call the forget log procedure (described above)
      issue rollback_request to the OSI TP protocol machine 68 for this branch
      increment complete_expected count
7. When all log records are read in, set Rch_status to active.
8. Wait for a Commit Complete or a Rollback Complete indication from the OSI TP protocol machine 68.
9. When indication is received and state of branch is RECOVERING, then
   call the forget log procedure (described above)
   decrement complete_expected count and total_remaining count check if total_remaining=0, and if so, then call IResourceManager::ReenlistmentComplete The following steps are performed when the interconnect 64 is restarting itself, e.g., after the interconnect has gone down for some reason:

1. Set rch_status to inactive. As a result, if the remote server 60 is trying to reconnect, the channels will not be accepted until all log records are read and synchronization with the MS DTC 56 is completed.
2. Call the MTS API, DTCGetTransactionManager, to obtain a pointer to the MS DTC Proxy Core object 106.
3. Create an instance of the CResourceManagerSink object 82 to provide the IResourceManagerSink interface so that the MS DTC 56 can notify the interconnect 64 of subsequent TMDowns. If this succeeds continue, otherwise set a timer event to try re-enlistment later.
4. Create a Resource Manager object 108 using the IResourceManagerFactory interface of the MS DTC Proxy Core object 106.
5. Initialize internal storage for log records and set total_remaining count to the number of log records present in secure storage.
5. Initialize complete_expected to 0.
6. Set OSI-TP rch_status to in_recovery.
7. Read the log file to determine which transactions are in-doubt, and for each log record:
   a) create a CRM record to match this log record and set txstate to RECOVERING.
   b) update the crm_id stored in the log record. This is needed in case the MS DTC 56 goes down while reenlistment is being performed.
   c) rebuild internal OSI TP data structures and variables and initialize fields for recovery in accordance with recovery procedures specified in OSI TP Protocol Specification.
   d) call IResourceManager::Reenlist for this in-doubt transaction branch, and pass the original PrepareInfo structure saved in the log record to the MS DTC 56 along with a time-out value.
   e) If the MS DTC 56 returns a time-out:
      save needed information for reenlist
      enqueue timer event (every 2 min) to retry enlistment for this branch
   f) If the MS DTC 56 returns an XACTSTAT_COMMITED then
      issue commit request to the OSI TP protocol machine 68 for this branch
      increment complete-expected count
   g) If the MS DTC 56 returns an XACTSTAT_ABORTED
      call the forget log procedure (described above)
      decrement total_remaining; if total_remaining=0, then call IResourceManager::ReenlistmentComplete
      release allocated OSI TP resource for this branch as part of clean-up
8. When a complete indication comes back and the state of the branch is RECOVERING:
   call the forget log procedure (described above)
   decrement complete_expected and total_remaining
   if total_remaining=0 then call IResourceManager::ReenlistmentComplete As the foregoing recovery procedures indicate, because the interconnect 64 of the present invention stores both MS DTC recovery information (PrepareInfo) and OSI TP recovery information together for each branch of a transaction, the interconnect 64 is able to perform recovery in both environment if necessary.

VII. Conclusion

As the foregoing illustrates, the present invention is directed to methods and apparatus that enable a component in a transaction processing environment to request, as part of a global transaction that is coordinated in that environment by a first transaction manager that is not XATMI-compliant, a resource on a remote server outside of that environment that is under the control of an XATMI-compliant transaction manager. It is understood that changes may be made to the embodiments described above without departing from the broad inventive concepts thereof. For example, although an embodiment is described herein in which the invention is employed in a Microsoft Transaction Server (MTS) environment, it is understood that the present invention can be used in any transaction processing environment that does not employ an XATMI-compliant transaction manager but that needs to request resources from a remote server that does operate under the control of an XATMI-compliant transaction manager. Accordingly, the present invention is not limited to the particular embodiments disclosed, but is intended to cover all modifications that are within the spirit and scope of the invention as defined by the appended claims.

What is claimed is:

1. In a transaction processing environment, wherein a component requests resources from one or more resource managers as part of a global transaction under the control of a first transaction manager that is not XATMI-compliant, an interconnect that enables the component to request, as part of the global transaction, a resource on a remote server outside of that environment that is under the control of a second transaction manager that is XATMI compliant, said interconnect comprising:

a connection manager comprising a protocol machine that communicates with the requested resource on the remote server in accordance with a bi-directional two-phase commitment communications protocol; and a resource manager that has a first interface that receives XATMI service requests from the component and a second interface that receives directives issued by the first transaction manager for the global transaction, the resource manager (i) translating said XATMI service requests received from the component and said directives issued by the first transaction manager into corresponding service requests of the bi-directional two-phase commitment communications protocol, (ii) issuing the corresponding service requests to the protocol machine of the connection manager, and (iii) coordinating the processing of said corresponding service requests by the protocol machine with the processing of corresponding events in the transaction processing environment of the first transaction manager.

2. The interconnect recited in claim 1, wherein the transaction processing environment of the first transaction manager comprises a Microsoft Transaction Server environment, and wherein the first transaction manager comprises a Microsoft Distributed Transaction Coordinator (MS DTC).

3. The interconnect recited in claim 2 wherein the information stored in the record for a given branch comprises a pointer to a transaction object associated with the global transaction within the MTS environment, said pointer being employed by the second interface of the resource manager to communicate information relating to the global transaction between the resource manager and the MS DTC.

4. The interconnect recited in claim 3 wherein the information stored in the record for a given branch further comprises a second pointer to an enlistment object associated with the global transaction within the MTS environment, said pointer being employed by the second interface of the resource manager to communicate information relating to the global transaction between the resource manager and the MS DTC.

5. The interconnect recited in claim 1, wherein said directives issued by the first transaction manager comprise ones of a prepare directive, a commit directive, and an abort directive.

6. The interconnect recited in claim 1, wherein ones of the XATMI service requests received from the component as part of the global transaction each represents a separate branch of the global transaction, and wherein for each branch of the global transaction, the resource manager instantiates an object representing that branch of the transaction and containing methods that the first transaction manager calls to issue said directives for that branch, said methods implementing at least a part of the functionality of said resource manager.

7. The interconnect recited in claim 1, wherein ones of the XATMI service requests received from the component as part of the global transaction each represents a separate branch of the global transaction, and wherein the resource manager generates a record for each branch in which information relating to the branch is stored for use by the resource manager in coordinating the processing of said corresponding service requests of the bi-directional two-phase commitment communication protocol by the protocol machine with the processing of corresponding events in the transaction processing environment of the first transaction manager.

8. The interconnect recited in claim 7 wherein the information stored in the record for a given branch comprises a first identifier assigned to the global transaction within the transaction processing environment of the first transaction manager and a second identifier generated by the resource manager from the first identifier in order to identify that transaction within the protocol machine.

9. The interconnect recited in claim 8 wherein the transaction processing environment of the first transaction manager comprises a Microsoft Transaction Server environment, and wherein the first identifier comprises a globally unique identifier (GUID).

10. The interconnect recited in claim 8 wherein the bi-directional two-phase commitment communications protocol comprises the OSI TP Protocol Specification, and wherein the second identifier comprises an atomic action identifier (AAID) in accordance with the requirements of the OSI TP Protocol Specification.

11. The interconnect recited in claim 8 wherein the information stored in the record for a given branch further comprises a third identifier generated by the resource manager in order to identify the particular branch of the transaction within the protocol machine.

12. The interconnect recited in claim 11 wherein the bi-directional two-phase commitment communications protocol comprises the OSI TP Protocol Specification, and wherein the second and third identifiers comprise an atomic action identifier (AAID) and a branch identifier (BRID), respectively, in accordance with the requirements of the OSI TP Protocol Specification.

13. The interconnect recited in claim 7 wherein the information stored in the record for a given branch comprises an identifier that associates that branch with a connection to the remote server established by the protocol machine for that branch.

14. The interconnect recited in claim 7 wherein the information stored in the record for a given branch comprises an indication of a state of the branch.

15. The interconnect recited in claim 14 wherein the state of the branch comprises one of the states of preparing, prepared, enlisting, enlisted, committing, aborting, and recovering.

16. The interconnect recited in claim 1, wherein the resource manager further operates to obtain, from the transaction processing environment of the first transaction manager, a first identifier assigned to the global transaction within that environment, and to generate therefrom a second identifier that is used to identify that transaction within the protocol machine.

17. The interconnect recited in claim 16, wherein the first identifier comprises a globally unique identifier (GUID).

18. The interconnect recited in claim 16 wherein the bi-directional two-phase commitment communications protocol comprises the OSI TP Protocol Specification, and wherein the second identifier comprises an atomic action identifier (AAID) in accordance with the requirements of the OSI TP Protocol Specification.

19. The interconnect recited in claim 16, wherein ones of the XATMI service requests received from the component as part of the global transaction each represents a separate branch of the global transaction, and wherein upon receipt of an XATMI service request from the component, the resource manager further generates, in addition to said second identifier, a third identifier that uniquely identifies the branch of the global transaction represented by that XATMI service request.

20. The interconnect recited in claim 19 wherein the bi-directional two-phase commitment communications protocol comprises the OSI TP Protocol Specification, and wherein the second and third identifiers comprise an atomic action identifier (AAID) and a branch identifier (BRID), respectively, in accordance with the requirements of the OSI TP Protocol Specification.

21. The interconnect recited in claim 19, wherein, for each branch of the global transaction, the first, second, and third identifiers are stored by the resource manager in a record for use by the resource manager in coordinating the processing of said corresponding service requests of the bi-directional two-phase commitment communication protocol by the protocol machine with the processing of corresponding events in the transaction processing environment of the first transaction manager.

22. The interconnect recited in claim 1, wherein ones of the XATMI service requests received from the component as part of the global transaction each represents a separate branch of the global transaction, and wherein, for each branch of the global transaction, the protocol machine establishes a connection to the remote server to process the service request for that branch.

23. The interconnect recited in claim 22, wherein, for each branch, the resource manager generates an identifier that identifies the connection to the remote server established by the protocol machine for that branch.

24. The interconnect recited in claim 23, wherein for each branch, the resource manager generates a record in which the identifier of the connection for that branch is stored for subsequent use by the protocol machine in identifying that connection.

25. The interconnect recited in claim 1, wherein ones of the XATMI service requests received from the component as part of the global transaction each represents a separate branch of the global transaction, and wherein for each branch of the global transaction, the resource manager further operates to store together, in a secure storage, information required by both the first transaction manager and the protocol machine to recover from a failure.

26. The interconnect recited in claim 1, wherein the resource manager operates under the control of a state machine comprising:

an initial state;

a state that indicates that an XATMI service request has been received from the component, the XATMI service request representing a branch of the global transaction, and that the second interface of the interconnect will attempt to enlist the branch with the first transaction manager in order to receive subsequent directives therefrom;

a state that indicates that the branch has been successfully enlisted with the first transaction manager;

a state that indicates that a request to prepare the branch for commitment has been received by the second interface from the first transaction manager;

a state that indicates that the protocol machine has received an indication from the remote server that the remote server is prepared to commit the branch;

a state that indicates that a request to commit the branch has been received by the second interface from the first transaction manager;

a state that indicates that a request to abort the branch has been received by the second interface from the first transaction manager or that a condition requiring the protocol machine to abort the transaction has occurred; and a state that indicates that the interconnect is attempting to recover from a failure.

27. The interconnect recited in claim 1, wherein the bi-directional two-phase commitment communications protocol comprises the OSI TP Protocol Specification, and wherein the protocol machine comprises an OSI TP protocol machine.

28. In a transaction processing environment, wherein a component requests resources from one or more resource managers as part of a global transaction under the control of a first transaction manager that is not XATMI-compliant, an interconnect that enables the component to request, as part of the global transaction, a resource on a remote server outside of that environment that is under the control of a second transaction manager that is XATMI compliant, the request representing a branch of the global transaction, said interconnect comprising:

a protocol machine that controls communications with the remote server in accordance with a bi-directional two-phase commitment communications protocol;

means for mapping a first identifier that identifies the global transaction within the transaction processing environment of the first transaction manager to a second identifier that serves to uniquely identify the global transaction within the protocol machine;

means for maintaining a record for the branch in which information relating to the branch is stored for use in coordinating events in the transaction processing environment of the first transaction manager with corresponding events in the protocol machine; and means for logging, in a secure storage, information concerning a state of the branch in both the transaction processing environment of the first transaction manager and the protocol machine to permit both that environment and the protocol machine to recover the branch in the event of a failure.

29. The interconnect recited in claim 28, wherein the transaction processing environment of the first transaction manager comprises a Microsoft Transaction Server environment, and wherein the first transaction manager comprises a Microsoft Distributed Transaction Coordinator (MS DTC).

30. The interconnect recited in claim 29, further comprising means for obtaining and storing in the record for the branch a pointer to a transaction object associated with the global transaction within the MTS environment.

31. The interconnect recited in claim 29, further comprising means for obtaining and storing in the record for the branch a pointer to an enlistment object associated with the global transaction within the MTS environment.

32. The interconnect recited in claim 28, wherein the bi-directional two-phase commitment communications protocol comprises the OSI TP Protocol Specification, and wherein the protocol machine comprises an OSI TP protocol machine.

33. The interconnect recited in claim 28, further comprising means for generating a third identifier that uniquely identifies the branch of the global transaction within the protocol machine.

34. The interconnect recited in claim 28, wherein said protocol machine establishes a connection to the remote server for the branch, over which the request is transmitted to the remote server.

35. The interconnect recited in claim 34, further comprising:
means for generating another identifier that identifies, within the protocol machine, the connection established by the protocol machine for the branch; and
means for storing the identifier of the connection in the record for the branch.

36. The interconnect recited in claim 28 further comprising means for storing in the record for the branch an indication of a state of the branch.

37. The interconnect recited in claim 36, wherein the state of the branch comprises one of the states of preparing, prepared, enlisting, enlisted, committing, aborting, and recovering.

38. In a transaction processing environment, wherein a component requests resources from one or more resource managers as part of a global transaction under the control of a first transaction manager that is not XATMI-compliant, an interconnect that enables the component to request, as part of the global transaction, a resource on a remote server outside of that environment that is under the control of a second transaction manager that is XATMI compliant, said method comprising:
receiving an XATMI service request from the component, the XATMI service request representing a branch of the global transaction;
obtaining a first identifier that identifies the global transaction within the transaction processing environment of the first transaction manager;
generating from the first identifier, a second identifier;
translating the XATMI service request into a corresponding service request of a bi-directional two-phase commitment communications protocol and issuing the corresponding service request to a protocol machine that implements the communication protocol; and
using the second identifier to uniquely identify the transaction within the protocol machine, the first and second identifiers providing a mapping that enables events associated with the global transaction in the transaction processing environment of the first transaction manager to be coordinated with events in the protocol machine.

39. The method recited in claim 38, wherein the transaction processing environment of the first transaction manager comprises a Microsoft Transaction Server (MTS) environment, and wherein the first transaction manager comprises a Microsoft Distributed Transaction Coordinator (MS DTC).

40. The method recited in claim 39, wherein the first identifier comprises a globally unique identifier (GUID).

41. The method recited in claim 40 wherein the GUID is obtained from a transaction object associated with the component within the MTS environment.

42. The method recited in claim 38, wherein the bi-directional two-phase commitment communications protocol comprises the OSI TP Protocol Specification, and wherein the protocol machine comprises an OSI TP protocol machine.

43. The method recited in claim 42 wherein the second identifier comprises an atomic action identifier (AAID), in accordance with the OSI TP Protocol Specification.

44. The method recited in claim 38, further comprising the step of generating a third identifier that uniquely identifies the branch of the global transaction within the protocol machine.

45. The method recited in claim 44, wherein the bi-directional two-phase commitment communications protocol comprises the OSI TP Protocol Specification, and wherein the second and third identifiers comprises an atomic action identifier (AAID) and a branch suffix thereto (BRID), respectively, in accordance with the OSI TP Protocol Specification.

46. The method recited in claim 38, further comprising the step of creating a record in which information relating to the branch of the transaction is stored for use in connection with subsequent actions relating to that branch.

47. The method recited in claim 46, further comprising the step of storing the first and second identifiers in said record.

48. The method recited in claim 46, further comprising the step of storing in the record an indication of a state of the branch.

49. The method recited in claim 48 wherein the state of the branch comprises one of the states of preparing, prepared, enlisting, enlisted, committing, aborting, and recovering.

50. The method recited in claim 38, further comprising the step of establishing, by the protocol machine, a connection to the remote server.

51. The method recited in claim 50, further comprising the step of generating another identifier that associates the branch with the connection to the remote server established by the protocol machine for that branch.

52. The method recited in claim 51, further comprising the steps of:
creating a record in which information relating to the branch of the transaction is stored for use in connection with subsequent actions relating to that branch; and
storing the identifier of the connection in the record.

53. The method recited in claim 38, further comprising the steps of:
receiving by the protocol machine a reply from the remote server in response to the XATMI service request;
enlisting the branch of the transaction with the first transaction manager to ensure that the first transaction manager provides notification of subsequent activity relating to the transaction;
receiving one of a prepare request, a commit request, and an abort request from the first transaction manager for the enlisted branch;

translating said one request from the first transaction manager to a corresponding service request of the bi-directional two-phase commitment communications protocol and issuing said corresponding service request to the remote server via the protocol machine; and upon receipt of an indication from the remote server that said corresponding service request was completed, providing an indication to the first transaction manager that the request was completed using a method of indication provided by the first transaction manager.

54. The method recited in claim 53, wherein the transaction processing environment of the first transaction manager comprises a Microsoft Transaction Server (MTS) environment, and wherein the first transaction manager comprises a Microsoft Distributed Transaction Coordinator (MS DTC).

55. The method recited in claim 54, wherein said step of enlisting the branch with the MS DTC comprises instantiating an object representing the branch of the transaction and containing methods that the MS DTC can call to issue directives for that branch, said methods including at least one of a prepare request, a commit request, an abort request, and a TMDown request.

56. The method recited in claim 53, further comprising the steps of:

receiving a prepare request from the first transaction manager; and logging together, in a secure storage, information required by both the first transaction manager and the protocol machine in order to recover and continue processing the transaction in the event of a failure.

57. The method recited in claim 56, wherein after the occurrence of a failure, the following steps are performed:

retrieving both the information required by the first transaction manager and the information required by the protocol machine from the secure storage; and using the retrieved information to recover the state of the transaction in both the transaction processing environment of the first transaction manager and in the protocol machine.

58. In a transaction processing environment, wherein a component requests resources from one or more resource managers as part of a global transaction under the control of a first transaction manager that is not XATMI-compliant, a method for enabling the component to request, as part of the global transaction, a resource on a remote server outside of that environment that is under the control of a second transaction manager that is XATMI compliant, the request representing a branch of the global transaction, said method comprising the steps of:

mapping a first identifier that identifies the global transaction within the transaction processing environment of the first transaction manager to a second identifier that serves to uniquely identify the global transaction within a protocol machine that implements a bi-directional two-phase commitment communications protocol and that is used to communicate with the remote server;

maintaining a record for the branch in which information relating to the branch is stored for use in coordinating events in the transaction processing environment of the first transaction manager with corresponding events in the protocol machine; and logging, in a secure storage, information concerning a state of the branch in both the transaction processing environment of the first transaction manager and the protocol machine to permit both that environment and the protocol machine to recover the branch in the event of a failure.

59. The method recited in claim 58, wherein the transaction processing environment of the first transaction manager comprises a Microsoft Transaction Server (MTS) environment, and wherein the first transaction manager comprises a Microsoft Distributed Transaction Coordinator (MS DTC).

60. The method recited in claim 59, wherein the first identifier comprises a globally unique identifier (GUID).

61. The method recited in claim 59, further comprising the step of obtaining and storing in the record for the branch a pointer to a transaction object associated with the global transaction within the MTS environment.

62. The method recited in claim 59, further comprising the step of obtaining and storing in the record for the branch a pointer to an enlistment object associated with the global transaction within the MTS environment.

63. The method recited in claim 58, wherein the bi-directional two-phase commitment communications protocol comprises the OSI TP Protocol Specification, and wherein the protocol machine comprises an OSI TP protocol machine.

64. The method recited in claim 63, wherein the second identifier comprises an atomic action identifier (AAID), in accordance with the OSI TP Protocol Specification.

65. The method recited in claim 58, further comprising the step of generating a third identifier that uniquely identifies the branch of the global transaction within the protocol machine.

66. The method recited in claim 65, further comprising the step of storing the first, second, and third identifiers in the record for the branch.

67. The method recited in claim 58, further comprising the step of establishing, by the protocol machine, a connection to the remote server for the branch, over which the request is transmitted to the remote server.

68. The method recited in claim 67, further comprising the steps of:

generating another identifier that identifies, within the protocol machine, the connection established by the protocol machine for the branch; and storing the identifier of the connection in the record for the branch.

69. The method recited in claim 58 further comprising the step of storing in the record for the branch an indication of a state of the branch.

70. The method recited in claim 69, wherein the state of the branch comprises one of the states of preparing, prepared, enlisting, enlisted, committing, aborting, and recovering.

71. A computer-readable medium on which program code is stored, said program code being for use in a transaction processing environment wherein a component requests resources from one or more resource managers as part of a global transaction under the control of a first transaction manager that is not XATMI-compliant, said program code, when executed on a computer, enabling the component to request, as part of the global transaction, a resource on a remote server outside of that environment that is under the control of a transaction manager that is XATMI-compliant, said program code comprising:

first program code that, when executed on a computer, implements a connection manager comprising a protocol machine that communicates with the requested resource on the remote server in accordance with a bi-directional two-phase commitment communications protocol; and second program code that, when executed on a computer, implements a resource manager that has a first interface that receives XATMI service request from the component and a second interface that receives directives issued by the first transaction manager for the global transaction, the resource manager (i) translating said XATMI service requests received from the component and said directives issued by the first transaction manager into corresponding service requests of the bi-directional two-phase commitment communications protocol, (ii) issuing the corresponding service requests to the protocol machine of the connection manager, and (iii) coordinating the processing of said corresponding service requests by the protocol machine with the processing of corresponding events in the transaction processing environment of the first transaction manager.

72. The computer-readable medium recited in claim 71, wherein said directives issued by the first transaction manager comprise ones of a prepare directive, a commit directive, and an abort directive.

73. The computer-readable medium recited in claim 71, wherein the transaction processing environment of the first transaction manager comprises a Microsoft Transaction Server environment, and wherein the first transaction manager comprises a Microsoft Distributed Transaction Coordinator (MS DTC).

74. The computer-readable medium recited in claim 73, wherein ones of the XATMI service requests received from the component as part of the global transaction each represents a separate branch of the global transaction, and wherein for each branch of the global transaction, the resource manager instantiates an object representing that branch of the transaction and containing methods that the first transaction manager calls to issue said directives for that branch, said methods implementing at least a part of the functionality of said resource manager.

75. The computer-readable medium recited in claim 71, wherein ones of the XATMI service requests received from the component as part of the global transaction each represents a separate branch of the global transaction, and wherein the resource manager generates a record for each branch in which information relating to the branch is stored for use by the resource manager in coordinating the processing of said corresponding service requests of the bi-directional two-phase commitment communication protocol by the protocol machine with the processing of corresponding events in the transaction processing environment of the first transaction manager.

76. The computer-readable medium recited in claim 71, wherein the resource manager further operates to obtain, from the transaction processing environment of the first transaction manager, a first identifier assigned to the global transaction within that environment, and to generate therefrom a second identifier that is used to identify that transaction within the protocol machine.

77. The computer-readable medium recited in claim 76 wherein the bi-directional two-phase commitment communications protocol comprises the OSI TP Protocol Specification, and wherein the second identifier comprises an atomic action identifier (AAID) in accordance with the requirements of the OSI TP Protocol Specification.

78. The computer-readable medium recited in claim 76, wherein ones of the XATMI service requests received from the component as part of the global transaction each represents a separate branch of the global transaction, and wherein upon receipt of an XATMI service request from the component, the resource manager further generates, in addition to said second identifier, a third identifier that uniquely identifies the branch of the global transaction represented by that XATMI service request.

79. The computer-readable medium recited in claim 78 wherein the bi-directional two-phase commitment communications protocol comprises the OSI TP Protocol Specification, and wherein the second and third identifiers comprise an atomic action identifier (AAID) and a branch identifier (BRID), respectively, in accordance with the requirements of the OSI TP Protocol Specification.

80. The computer-readable medium recited in claim 78, wherein, for each branch of the global transaction, the first, second, and third identifiers are stored by the resource manager in a record for use by the resource manager in coordinating the processing of said corresponding service requests of the bi-directional two-phase commitment communication protocol by the protocol machine with the processing of corresponding events in the transaction processing environment of the first transaction manager.

81. The computer-readable medium recited in claim 71, wherein transaction processing environment of the first transaction manager comprises a Microsoft Transaction Server (MTS) environment, and wherein the first identifier comprises a globally unique identifier (GUID).

82. The computer-readable medium recited in claim 71, wherein ones of the XATMI service requests received from the component as part of the global transaction each represents a separate branch of the global transaction, and wherein, for each branch of the global transaction, the protocol machine establishes a connection to the remote server to process the service request for that branch.

83. The computer-readable medium recited in claim 82, wherein, for each branch, the resource manager generates an identifier that identifies the connection to the remote server established by the protocol machine for that branch.

84. The computer-readable medium recited in claim 83, wherein for each branch, the resource manager generates a record in which the identifier of the connection for that branch is stored for subsequent use by the protocol machine in identifying that connection.

85. The computer-readable medium recited in claim 71, wherein ones of the XATMI service requests received from the component as part of the global transaction each represents a separate branch of the global transaction, and wherein for each branch of the global transaction, the resource manager further operates to store together, in a secure storage, information required by both the first transaction manager and the protocol machine to recover from a failure.

86. The computer-readable medium recited in claim 71, wherein the second program code that implements the resource manager comprises a state machine having:
   an initial state;
   a state that indicates that an XATMI service request has been received from the component, the XATMI service request representing a branch of the global transaction, and that the second interface of the interconnect will attempt to enlist the branch with the first transaction manager in order to receive subsequent directives therefrom;
   a state that indicates that the branch has been successfully enlisted with the first transaction manager;
   a state that indicates that a request to prepare the branch for commitment has been received by the second interface from the first transaction manager;
   a state that indicates that the protocol machine has received an indication from the remote server that the remote server is prepared to commit the branch;

a state that indicates that a request to commit the branch has been received by the second interface from the first transaction manager;

a state that indicates that a request to abort the branch has been received by the second interface from the first transaction manager or that a condition requiring the protocol machine to abort the transaction has occurred; and a state that indicates that the interconnect is attempting to recover from a failure.

87. The computer-readable medium recited in claim 71, wherein the bi-directional two-phase commitment communications protocol comprises the OSI TP Protocol Specification, and wherein the protocol machine comprises an OSI TP protocol machine.

88. A computer-readable medium on which program code is stored, said program code being for use in a transaction processing environment wherein a component requests resources from one or more resource managers as part of a global transaction under the control of a first transaction manager that is not XATMI-compliant, said program code, when executed on a computer, enabling the component to request, as part of the global transaction, a resource on a remote server outside of that environment that is under the control of a transaction manager that is XATMI-compliant, the request representing a branch of the global transaction, said program code further causing said computer to:

map a first identifier that identifies the global transaction within the transaction processing environment of the first transaction manager to a second identifier that serves to uniquely identify the global transaction within a protocol machine that implements a bi-directional two-phase commitment communications protocol and that is used to communicate with the remote server;

maintain a record for the branch in which information relating to the branch is stored for use in coordinating events in the transaction processing environment of the first transaction manager with corresponding events in the protocol machine; and log, in a secure storage, information concerning a state of the branch in both the transaction processing environment of the first transaction manager and the protocol machine to permit both that environment and the protocol machine to recover the branch in the event of a failure.

89. The computer-readable medium recited in claim 88, wherein the transaction processing environment of the first transaction manager comprises a Microsoft Transaction Server (MTS) environment, and wherein the first transaction manager comprises a Microsoft Distributed Transaction Coordinator (MS DTC).

90. The computer-readable medium recited in claim 89, wherein the first identifier comprises a globally unique identifier (GUID).

91. The computer-readable medium recited in claim 89, wherein the program code further causes the computer to obtain and store in the record for the branch a pointer to a transaction object associated with the global transaction within the MTS environment.

92. The computer-readable medium recited in claim 89, wherein the program code further causes the computer to obtain and store in the record for the branch a pointer to an enlistment object associated with the global transaction within the MTS environment.

93. The computer-readable medium recited in claim 88, wherein the bi-directional two-phase commitment communications protocol comprises the OSI TP Protocol Specification, and wherein the protocol machine comprises an OSI TP protocol machine.

94. The computer-readable medium recited in claim 93, wherein the second identifier generated by the program code comprises an atomic action identifier (AAID), in accordance with the OSI TP Protocol Specification.

95. The computer-readable medium recited in claim 88, wherein the program code further causes the computer to generate a third identifier that uniquely identifies the branch of the global transaction within the protocol machine.

96. The computer-readable medium recited in claim 95, wherein the program code further causes the computer to store the first, second, and third identifiers in the record for the branch.

97. The computer-readable medium recited in claim 88, wherein the program code further causes the computer to establish, via the protocol machine, a connection to the remote server for the branch, over which the request is transmitted to the remote server.

98. The computer-readable medium recited in claim 97, wherein the program code further causes the computer to:

generate another identifier that identifies, within the protocol machine, the connection established by the protocol machine for the branch; and store the identifier of the connection in the record for the branch.

99. The computer-readable medium recited in claim 88 wherein the program code further causes the computer to store in the record for the branch an indication of a state of the branch.

100. The computer-readable medium recited in claim 99, wherein the state of the branch comprises one of the states of preparing, prepared, enlisting, enlisted, committing, aborting, and recovering.

* * * * *